US010635347B2

(12) United States Patent
Koo et al.

(10) Patent No.: US 10,635,347 B2
(45) Date of Patent: Apr. 28, 2020

(54) MEMORY SYSTEM AND OPERATING METHOD THEREOF

(71) Applicant: SK hynix Inc., Gyeonggi-do (KR)

(72) Inventors: Duck-Hoi Koo, Gyeonggi-do (KR); Soong-Sun Shin, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 139 days.

(21) Appl. No.: 15/795,425

(22) Filed: Oct. 27, 2017

(65) Prior Publication Data

US 2018/0275920 A1 Sep. 27, 2018

(30) Foreign Application Priority Data

Mar. 27, 2017 (KR) .................. 10-2017-0038277

(51) Int. Cl.
*G06F 3/06* (2006.01)
(52) U.S. Cl.
CPC .......... *G06F 3/0659* (2013.01); *G06F 3/0604* (2013.01); *G06F 3/0611* (2013.01); *G06F 3/0673* (2013.01); *G06F 3/0679* (2013.01)
(58) Field of Classification Search
CPC .... G06F 3/0659; G06F 3/0604; G06F 3/0611; G06F 3/0673; G06F 3/0679
See application file for complete search history.

(56) References Cited

U.S. PATENT DOCUMENTS

| 9,372,632 B2 | 6/2016 | Lassa | |
|---|---|---|---|
| 2004/0172506 A1* | 9/2004 | Gotoh | G06F 3/0611 711/158 |
| 2005/0135145 A1* | 6/2005 | Lee | G11C 8/18 365/154 |
| 2010/0169684 A1* | 7/2010 | Jeyaseelan | G06F 1/3203 713/323 |
| 2012/0311408 A1* | 12/2012 | Nakanishi | G06F 11/1048 714/773 |
| 2014/0112089 A1* | 4/2014 | Tsang | G11C 8/18 365/233.1 |
| 2015/0169406 A1* | 6/2015 | Li | G06F 11/1012 714/763 |
| 2016/0179373 A1* | 6/2016 | Erez | G11C 11/5628 711/154 |

FOREIGN PATENT DOCUMENTS

| KR | 101481898 | 1/2015 |
|---|---|---|
| KR | 1020150001034 | 1/2015 |
| KR | 1020160016896 | 2/2016 |

* cited by examiner

*Primary Examiner* — Ryan Bertram
(74) *Attorney, Agent, or Firm* — IP & T Group LLP

(57) ABSTRACT

A memory system may include: a memory device; and a controller suitable for: receiving a plurality of commands from a host; performing command operations corresponding to the commands to the memory device; providing operation results of the command operations to the host; and performing processing results including processing receptions of the commands, requests for performing the command operations and operation results for the command operations at a regular time duration interval.

20 Claims, 13 Drawing Sheets

MEMORY SYSTEM AND OPERATING METHOD THEREOF

CROSS-REFERENCE TO RELATED APPLICATION

This application claims priority under 35 U.S.C. § 119 to Korean Patent Application No. 10-2017-0038277 filed on Mar. 27, 2017, the disclosure of which is incorporated herein by reference in its entirety.

TECHNICAL FIELD

Exemplary embodiments relate to a memory system, and more particularly, to a memory system which processes data with respect to a memory device, and an operating method thereof.

DISCUSSION OF THE RELATED ART

The computer environment paradigm has changed to ubiquitous computing systems that can be used anytime and anywhere. That is, use of portable electronic devices such as mobile phones, digital cameras, and notebook computers has rapidly increased. These portable electronic devices generally use a memory system having one or more memory devices for storing data. A memory system may be used as a main or an auxiliary storage device of a portable electronic device.

Memory systems provide excellent stability, durability, high information access speed, and low power consumption because they have no moving parts. Examples of memory systems having such advantages include universal serial bus (USB) memory devices, memory cards having various interfaces, and solid state drives (SSD).

SUMMARY

Various embodiments are directed to a memory system and an operating method thereof, capable of minimizing complexity and performance deterioration of a memory system and maximizing use efficiency of a memory device, thereby quickly and stably processing data with respect to the memory device.

In an embodiment, a memory system may include: a memory device; and a controller suitable for: receiving a plurality of commands from a host; performing command operations corresponding to the commands to the memory device; providing operation results of the command operations to the host; and performing processing results including processing receptions of the commands, requests for performing the command operations and operation results for the command operations at a regular time duration interval.

The controller may be suitable for setting the regular time duration interval in correspondence to capabilities for the commands in the memory system and queue capacities of command queues in the controller.

The regular time duration interval may be defined as processing time durations and idle time durations for the commands and the command operations.

The controller may be suitable for receiving the commands from the host at the regular time duration interval, and transferring the commands between the command queues at the regular time duration interval.

The controller may be suitable for requesting performing of the command operations to the memory device through the command queues at the regular time duration interval, and providing the operation results to the host through the command queues at the regular time duration interval.

The controller may be suitable for receiving the commands from the host at the regular time duration interval based on a first command queue at an interface for the host, and transferring requests for performing of the command operations to the memory device at the regular time duration interval based on a second command queue at an interface for the memory device.

The controller may be suitable for transferring the commands from the first command queue to the second command queue at the regular time duration interval.

The controller may be suitable for receiving the operation results from the memory device at the regular time duration interval based on the second command queue at the interface for the memory device, and transferring the operation results to the host at the regular time duration interval through the first command queue at the interface for the host.

The controller may be suitable for transferring the operation results from the second command queue to the first command queue at the regular time duration interval.

The controller may be suitable for receiving the commands from the host initially in correspondence to a maximum queue capacity of the command queues.

In an embodiment, a method for operating a memory system, the method may include: receiving a plurality of commands from a host; performing command operations corresponding to the commands, in the memory device; providing operation results of the command operations to the host; and performing processing results including receptions of the commands, requests for performing of the command operations and providing of the performance results at a regular time duration interval.

The method may further include: setting the regular time duration interval in correspondence to capabilities for the commands in the memory system and queue capacities of command queues in the controller.

The regular time duration interval may be defined as processing time durations and idle time durations for the commands and the command operations.

The method may further include: transferring the commands between the command queues at the regular time duration interval; and requesting performing of the command operations to the memory device through the command queues at the regular time duration interval.

The receiving of the commands may include receiving the commands from the host at the regular time duration interval through a first command queue at an interface for the host, and the requesting of the performing of the command operation may include transferring requests for performing of the command operations, to the memory device at the regular time duration interval through a second command queue at an interface for the memory device.

The transferring of the commands between the command queues may include transferring the commands from the first command queue to the second command queue at the regular time duration interval.

The method may further include: transferring the performance results between the command queues at the regular time duration interval.

The providing may include: receiving the performance results from the memory device at the regular time duration interval based on the second command queue at the interface for the memory device; and transferring the performance results to the host at the regular time duration interval based on the first command queue at the interface for the host.

The transferring of the performance results between the command queues may include transferring the performance results from the second command queue to the first command queue at the regular time duration interval.

The receiving may further include receiving the commands from the host initially in correspondence to a maximum queue capacity of the command queues.

BRIEF DESCRIPTION OF THE DRAWINGS

These and other features and advantages of the present invention will become apparent to those skilled in the art to which the present invention pertains from the following detailed description in reference to the accompanying drawings, wherein.

DETAILED DESCRIPTION

Figure 1:
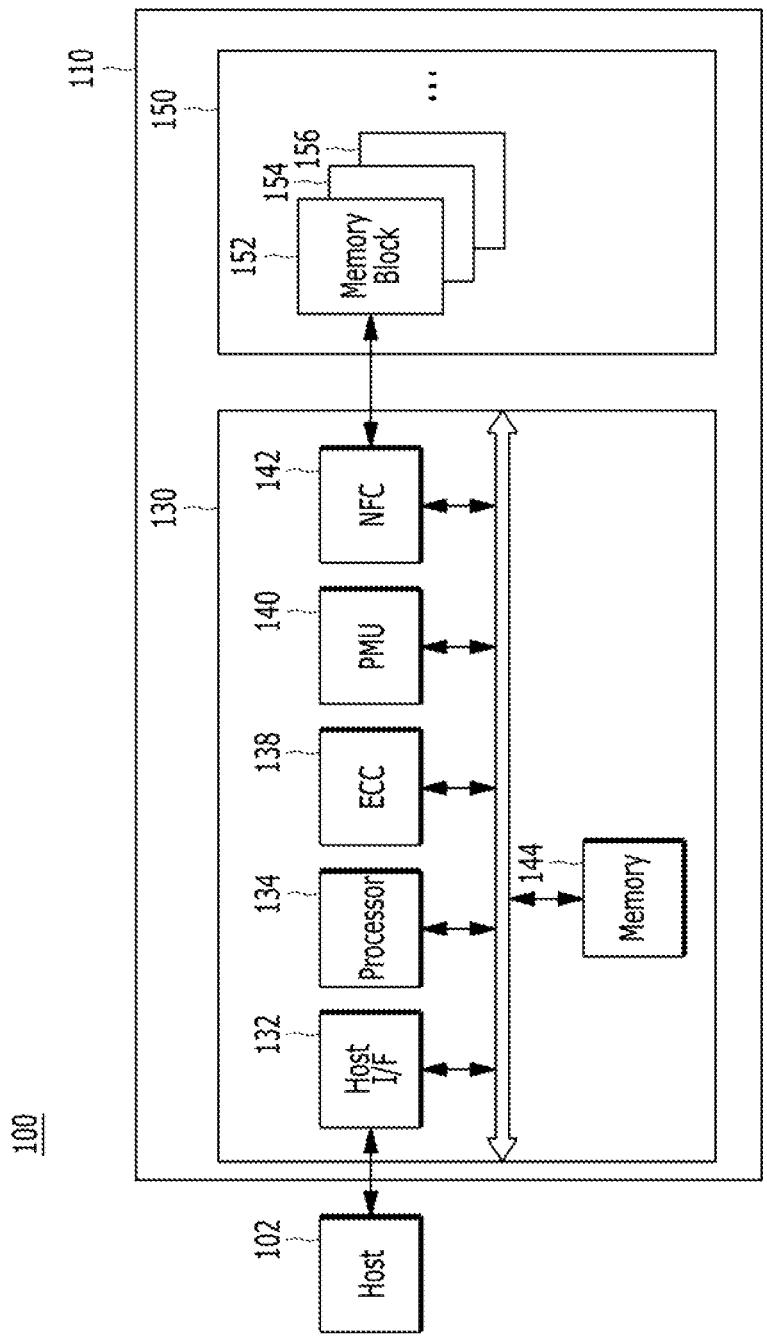
FIG. 1 is a block diagram illustrating a data processing system including a memory system in accordance with an embodiment of the present invention.

Various embodiments of the present invention are described below in more detail with reference to the accompanying drawings. We note, however, that the present invention may be embodied in different other embodiments, forms and variations thereof and should not be construed as being limited to the embodiments set forth herein. Rather, the described embodiments are provided so that this disclosure will be thorough and complete, and will fully convey the present invention to those skilled in the art to which this invention pertains. Throughout the disclosure, like reference numerals refer to like parts throughout the various figures and embodiments of the present invention.

It will be understood that, although the terms "first", "second", "third", and so on may be used herein to describe various elements, these elements are not limited by these terms. These terms are used to distinguish one element from another element. Thus, a first element described below could also be termed as a second or third element without departing from the spirit and scope of the present invention.

The drawings are not necessarily to scale and, in some instances, proportions may have been exaggerated in order to clearly illustrate features of the embodiments.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

The terminology used herein is for the purpose of describing particular embodiments only and is not intended to be limiting of the present invention. As used herein singular forms are intended to include the plural forms as well, unless the context clearly indicates otherwise. It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present invention belongs in view of the present disclosure. It will be further understood that terms, such as those defined in commonly used dictionaries, should be interpreted as having a meaning that is consistent with their meaning in the context of the present disclosure and the relevant art and will not be interpreted in an idealized or overly formal sense unless expressly so defined herein.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

It is also noted, that in some instances, as would be apparent to those skilled in the relevant art, a feature or element described in connection with one embodiment may be used singly or in combination with other features or elements of another embodiment, unless otherwise specifically indicated.

FIG. 1 is a block diagram illustrating a data processing system 100 including a memory system 110 in accordance with an embodiment of the present invention.

Referring to FIG. 1, the data processing system 100 may include a host 102 and the memory system 110.

The host 102 may include portable electronic devices such as a mobile phone, MP3 player and laptop computer or non-portable electronic devices such as a desktop computer, game machine, TV and projector.

The memory system 110 may operate to store data for the host 102 in response to a request of the host 102. Non-limited examples of the memory system 110 may include a solid state drive (SSD), a multi-media card (MMC), a secure digital (SD) card, a universal storage bus (USB) device, a universal flash storage (UFS) device, compact flash (CF) card, a smart media card (SMC), a personal computer memory card international association (PCMCIA) card and memory stick. The MMC may include an embedded MMC (eMMC), reduced size MMC (RS-MMC) and micro-MMC. The SD card may include a mini-SD card and micro-SD card.

The memory system 110 may be embodied by various types of storage devices. Non-limited examples of storage devices included in the memory system 110 may include volatile memory devices such as a DRAM dynamic random access memory (DRAM) and a static RAM (SRAM) and nonvolatile memory devices such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), resistive RAM (RRAM) and a flash memory. The flash memory may have a 3-dimensional (3D) stack structure.

The memory system 110 may include a memory device 150 and a controller 130. The memory device 150 may store data for the host 120, and the controller 130 may control data storage into the memory device 150.

The controller 130 and the memory device 150 may be integrated into a single semiconductor device, which may be included in the various types of memory systems as exemplified above.

Non-limited application examples of the memory system 110 may include a computer, an Ultra Mobile PC (UMPC), a workstation, a net-book, a Personal Digital Assistant (PDA), a portable computer, a web tablet, a tablet computer, a wireless phone, a mobile phone, a smart phone, an e-book, a Portable Multimedia Player (PMP), a portable game machine, a navigation system, a black box, a digital camera, a Digital Multimedia Broadcasting (DMB) player, a 3-dimensional television, a smart television, a digital audio recorder, a digital audio player, a digital picture recorder, a digital picture player, a digital video recorder, a digital video player, a storage device constituting a data center, a device capable of transmitting/receiving information in a wireless environment, one of various electronic devices constituting a home network, one of various electronic devices constituting a computer network, one of various electronic devices constituting a telematics network, a Radio Frequency Identification (RFID) device, or one of various components constituting a computing system.

The memory device 150 may be a nonvolatile memory device and may retain data stored therein even though power is not supplied. The memory device 150 may store data provided from the host 102 through a write operation, and provide data stored therein to the host 102 through a read operation. The memory device 150 may include a plurality of memory dies (not shown), each memory die including a plurality of planes (not shown), each plane including a plurality of memory blocks 152 to 156, each of the memory blocks 152 to 156 may include a plurality of pages, and each of the pages may include a plurality of memory cells coupled to a word line.

Detailed descriptions will be made below with reference to FIGS. 2 to 4 and 6 for the structure of the memory device 150.

The controller 130 may control the memory device 150 in response to a request from the host 102. For example, the controller 130 may provide data read from the memory device 150 to the host 102, and store data provided from the host 102 into the memory device 150. For this operation, the controller 130 may control read, write, program and erase operations of the memory device 150.

The controller 130 may include a host interface (I/F) unit 132, a processor 134, an error correction code (ECC) unit 138, a Power Management Unit (PMU) 140, a memory device controller (MDC) such as, for example, a NAND flash controller (NFC) 142 and a memory 144 all operatively coupled via an internal bus.

The host interface unit 132 may be configured to process a command and data of the host 102, and may communicate with the host 102 through one or more of various interface protocols such as universal serial bus (USB), multi-media card (MMC), peripheral component interconnect-express (PCI-E), small computer system interface (SCSI), serial-attached SCSI (SAS), serial advanced technology attachment (SATA), parallel advanced technology attachment (PATA), enhanced small disk interface (ESDI) and integrated drive electronics (IDE).

The ECC unit 138 may detect and correct an error contained in the data read from the memory device 150. In other words, the ECC unit 138 may perform an error correction decoding process to the data read from the memory device 150 through an ECC code used during an ECC encoding process. According to a result of the error correction decoding process, the ECC unit 138 may output a signal, for example, an error correction success/fail signal. When the number of error bits is more than a threshold value of correctable error bits, the ECC unit 138 may not correct the error bits, and may output an error correction fail signal.

The ECC unit 138 may perform error correction through a coded modulation such as Low-Density Parity Check (LDPC) code, Bose-Chaudhri-Hocquenghem (BCH) code, turbo code, Reed-Solomon code, convolution code, Recursive Systematic Code (RSC), Trellis-Coded Modulation (TCM) and Block coded modulation (BCM). However, the ECC unit 138 is not limited thereto. The ECC unit 138 may include all circuits, modules, systems or devices for error correction.

The PMU 140 may provide and manage power of the controller 130.

The NFC 142 may serve as a memory/storage interface for interfacing the controller 130 and the memory device 150 such that the controller 130 controls the memory device 150 in response to a request from the host 102. When the memory device 150 is a flash memory or specifically a NAND flash memory the NFC 142 may be an MDC and may generate a control signal for the memory device 150 and process data to be provided to the memory device 150 under the control of the processor 134. The NFC 142 may work as an interface (e.g., a NAND flash interface) for processing a command and data between the controller 130 and the memory device 150. Specifically, the NFC 142 may support data transfer between the controller 130 and the memory device 150.

The memory 144 may serve as a working memory of the memory system 110 and the controller 130, and store data for driving the memory system 110 and the controller 130. The controller 130 may control the memory device 150 to perform read, write, program and erase operations in response to a request from the host 102. The controller 130 may provide data read from the memory device 150 to the host 102, may store data provided from the host 102 into the memory device 150. The memory 144 may store data required for the controller 130 and the memory device 150 to perform these operations.

The memory 144 may be embodied by a volatile memory. For example, the memory 144 may be embodied by static random access memory (SRAM) or dynamic random access memory (DRAM) The memory 144 may be disposed within or out of the controller 130. FIG. 1 exemplifies the memory 144 disposed within the controller 130. In an embodiment, the memory 144 may be embodied by an external volatile memory having a memory interface transferring data between the memory 144 and the controller 130.

The processor 134 may control the overall operations of the memory system 110. The processor 134 may drive firmware to control the overall operations of the memory system 110. The firmware may be referred to as flash translation layer (FTL).

The processor 134 of the controller 130 may include a management unit (not illustrated) for performing a bad management operation of the memory device 150. The management unit may perform a bad block management operation of checking a bad block, in which a program fail occurs due to the characteristic of a NAND flash memory during a program operation, among the plurality of memory blocks 152 to 156 included in the memory device 150. The management unit may write the program-failed data of the bad block to a new memory block. In the memory device 150 having a 3D stack structure, the bad block management operation may reduce the use efficiency of the memory device 150 and the reliability of the memory system 110. Thus, the bad block management operation needs to be performed with more reliability.

Also, in a memory system in accordance with an embodiment of the present disclosure, for instance, in the case where the controller 130 performs a plurality of command operations corresponding to a plurality of commands received from the host 102, for example, a plurality of program operations corresponding to a plurality of write commands, a plurality of read operations corresponding to a plurality of read commands and a plurality of erase operations corresponding to a plurality of erase commands, in the memory device 150, the plurality of commands, the command operations corresponding to the plurality of commands and performance results of the command operations are respectively managed such that the plurality of commands received from the host 102 and the plurality of command operations corresponding to the plurality of commands are processed at a regular latency For example, the plurality of commands are transferred to the memory device 150 at a first regular time duration interval. The plurality of command operations are performed at a second regular time duration interval to the memory device 150 and the performance results (also referred to as operation results) of the command operations which are performed in the memory device 150 are provided to the controller 130 at a third regular time duration interval. The operation results are transferred from the controller 130 to the host 102 at a fourth regular time duration interval. The first to fourth time duration intervals may be the same or may be different.

The controller 130 receives the plurality of commands from the host 102 through the host interface unit 132 which is driven at a hot interface layer (HIL), queues and parses the plurality of commands received from the host 102, and transfers the commands to a flash interface unit which is driven at a flash interface layer (FIL). The flash interface unit may be or may be included in the MDC 142.

In this regard, the controller 130 transfers the plurality of commands received from the host 102, from the host interface unit 132 to the flash interface unit, at a regular time duration interval.

According to this fact, the controller 130 requests performing of the command operations corresponding to the plurality of commands, through the flash interface unit to the memory device 150 at a regular time duration interval, that is, causes the command operations to be performed at a regular time duration interval in the memory device 150.

Further, the controller 130 receives the operation results of the command operations from the memory device 150 through the flash interface unit, transfers the operation results from the flash interface unit to the host interface unit 132 at a regular time duration interval.

The controller 130 provides the operation results to the host 102 through the host interface unit 132 at a regular time duration interval.

Time duration intervals may be defined by processing time durations and idle time durations. That is to say, in the case where a first processing time duration, a first idle time duration, a second processing time duration and a second idle time duration exist by intervals, for example, times, according to repetition of processing time durations and idle time durations, time duration intervals include a processing time duration interval which corresponds to the interval between the first processing time duration and the second processing time duration, that is, the first idle time duration, and an idle time duration interval which corresponds to the interval between the first idle time duration and the second idle time duration, that is, the second processing time duration. In the processing time durations, there may be included time durations for which a plurality of commands are transferred, that is, processing time durations for which transfer of commands is performed, processing time durations for which command operations corresponding to a plurality of commands are performed, and time durations for which performance results of command operations are transferred, that is, processing time durations for which transfer of the performance results is performed. In the idle time durations, there may be included idle time durations from after optional operations are performed to before other optional operations are performed, as intervals between processing time durations. For example, in the idle time durations, there may be included idle time durations from after first commands are transferred to before second commands are transferred, idle time durations from after the first commands or the second commands are transferred to before first command operations or second command operations corresponding to the first commands or the second commands are performed, idle time durations from after the first command operations or the second command operations are performed to before first performance results of the first command operations or second performance results of the second command operations are transferred, and idle time durations from after the first performance results are transferred or provided to before the second performance results are transferred or provided.

In the memory system 110 in accordance with an embodiment of the present disclosure a plurality of commands received from the host 102 and a plurality of command operations corresponding to the commands are processed at a regular latency, and thereby, the command operations are performed regularly in the controller 130 and the memory device 150. In particular, transfer of the plurality of commands, performing of the command operations and transfer of operation results are processed at a regular time duration interval, that is, are processed for regular processing time durations and idle time durations. Therefore, in the memory system 110 in accordance with the embodiment of the present disclosure, the plurality of command operations are performed regularly and normally processing of the plurality of commands, performing of the command operations and processing of the operation results are implemented normally in a regularly dispersed manner. Also, in the case of receiving the plurality of commands from the host 102, the operational performance of the memory system 110 may be retained regularly, and thus, the command operations may be performed stably in the memory system 110, as a result of which the reliability of the memory system 110 may be improved.

Specifically, in the memory system 110 in accordance with the embodiment of the present disclosure, by processing the plurality of commands received from the host 102 and the plurality of command operations corresponding to the commands at a regular latency, it is possible to perform, regularly and normally the plurality of command operations within a maximum usable power level and voltage/current level in the memory system 110 including the controller 130 and the memory device 150, a maximum operation clock in the memory system 110 and a maximum temperature level in the memory system 110. As a consequence, it is possible to perform stably the command operations in the memory system 110. Since detailed descriptions will be made below with reference to FIGS. 5 to 9 for processing of transfer of a plurality of commands, performing of command operations corresponding to the plurality of commands and transfer of performance results of the command operations in the case where the plurality of commands are received from the host 102 in the memory system in accordance with the embodiment of the present disclosure, further descriptions thereof will be omitted herein.

Other units may be included in the memory system 110 of FIG. 1. For example, a management unit (not shown) for performing bad management for the memory device 150 may be included in the processor 134 of the controller 130. The management unit checks a bad block in the plurality of memory blocks 152, 154 and 156 included in the memory device 150, and then, performs bad block management of processing a checked bad block. The bad management means that, in the case where the memory device 150 is a flash memory, for example, a NAND flash memory, a program fail may occur when performing data write, for example, data program, due to the characteristic of the NAND flash memory, a memory block where the program fail has occurred is processed as a bad, and program-failed data are written, that is, programmed, in a new memory block. Moreover, in the case where the memory device 150 has a 3-dimensional stack structure as described above, if a corresponding block is processed as a bad block according to a program fail, because the utilization efficiency of the memory device 150 and the reliability of the memory system 110 may deteriorate abruptly, it is necessary to reliably perform bad block management. Hereinbelow, a memory device in the memory system in accordance with the embodiment of the present disclosure will be described below in detail with reference to FIGS. 2 to 4.

Figure 2:
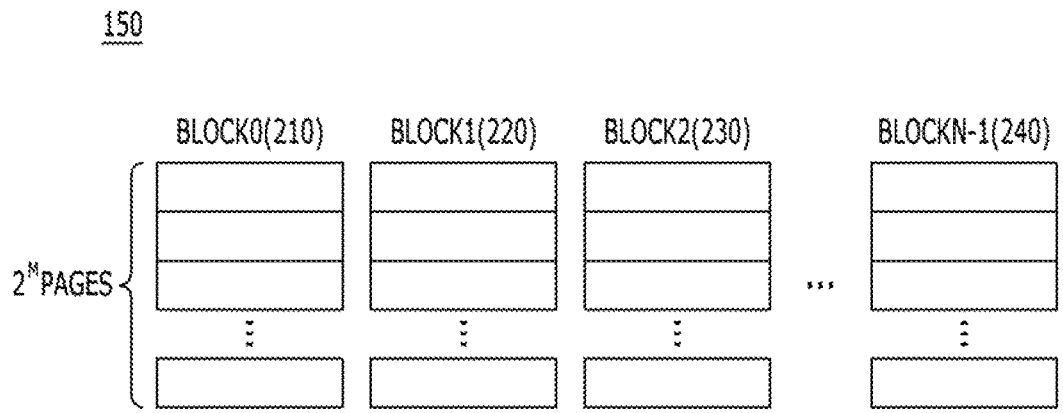
FIG. 2 is a schematic diagram illustrating an exemplary configuration of a memory device employed in the memory system shown in FIG. 1.

FIG. 2 is a schematic diagram illustrating the memory device 150.

Referring to FIG. 2, the memory device 150 may include a plurality of memory blocks 0 to N−1 and each of the blocks 0 to N−1 may include a plurality of pages, for example $2^M$ pages the number of which may vary according to circuit design. Memory cells included in the respective memory blocks 0 to N−1 may be one or more of a single level cell (SLC) storing 1-bit data, or a multi-level cell (MLC) storing 2- or more bit data. In an embodiment, the memory device 150 may include a plurality of triple level cells (TLC) each storing 3-bit data. In another embodiment, the memory device may include a plurality of quadruple level cells (QLC) each storing 4-bit level cell.

Figure 3:
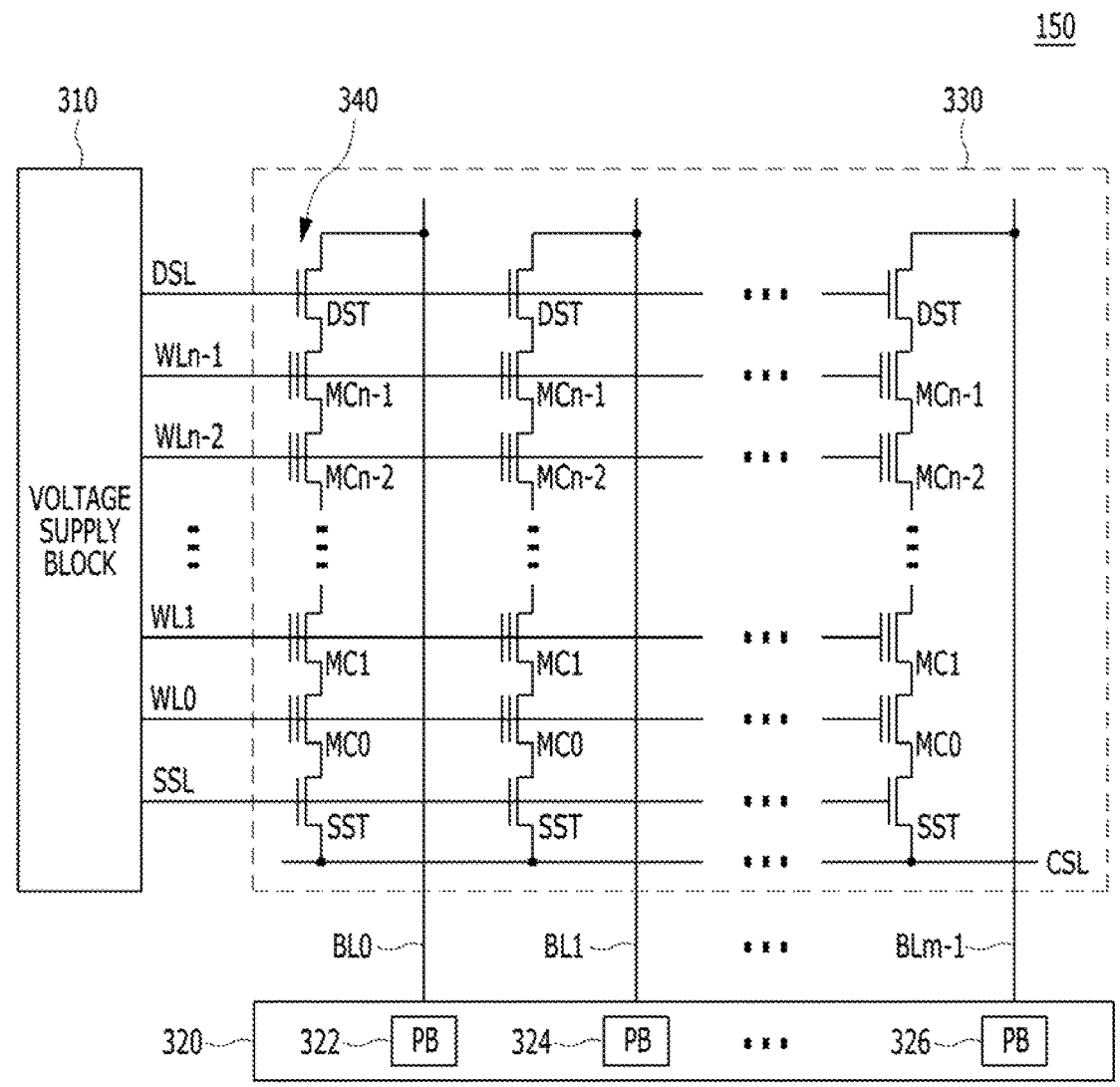
FIG. 3 is a circuit diagram illustrating an exemplary configuration of a memory cell array of a memory block in the memory device shown in FIG. 2.

FIG. 3 is a circuit diagram illustrating an exemplary configuration of a memory cell array of a memory block in the memory device 150.

Referring to FIG. 3, a memory block 330 which may correspond to any of the plurality of memory blocks 152 to 156 included in the memory device 150 of the memory system 110 may include a plurality of cell strings 340 coupled to a plurality of corresponding bit lines BL0 to BLm−1. The cell string 340 of each column may Include one or more drain select transistors DST and one or more source select transistors SST. Between the drain and source select transistors DST and SST, a plurality of memory cells MC0 to MCn−1 may be coupled in series. In an embodiment, each of the memory cell transistors MC0 to MCn−1 may be embodied by an MLC capable of storing data information of a plurality of bits. Each of the cell strings 340 may be electrically coupled to a corresponding bit line among the plurality of bit lines BL0 to BLm−1. For example, as described in reference with FIG. 3, the first cell string is coupled to the first bit line BL0, and the last cell string is coupled to the last bit line BLm−1.

Although FIG. 3 illustrates NAND flash memory cells, the invention is not limited in this way. It is noted that the memory cells may be NOR flash memory cells, or hybrid flash memory cells including two or more kinds of memory cells combined therein. Also, it is noted that the memory device 150 may be a flash memory device including a conductive floating gate as a charge storage layer or a charge trap flash (CTF) memory device including an insulation layer as a charge storage layer.

The memory device 150 may further include a voltage supply unit 310 which provides word line voltages including a program voltage, a read voltage and a pass voltage to supply to the word lines according to an operation mode. The voltage generation operation of the voltage supply unit 310 may be controlled by a control circuit (not illustrated). Under the control of the control circuit, the voltage supply unit 310 may select one of the memory blocks (or sectors) of the memory cell array, select one of the word lines of the selected memory block, and provide the word line voltages to the selected word line and the unselected word lines as may be needed.

The memory device 150 may include a read/write circuit 320 which is controlled by the control circuit. During a verification/normal read operation, the read/write circuit 320 may operate as a sense amplifier for reading data from the memory cell array. During a program operation, the read/write circuit 320 may operate as a write driver for driving bit lines according to data to be stored in the memory cell array. During a program operation, the read/write circuit 320 may receive from a buffer (not illustrated) data to be stored into the memory cell array, and drive bit lines according to the received data. The read/write circuit 320 may include a plurality of page buffers 322 to 326 respectively corresponding to columns (or bit lines) or column pairs (or bit line pairs), and each of the page buffers 322 to 326 may include a plurality of latches (not illustrated).

Figure 4:
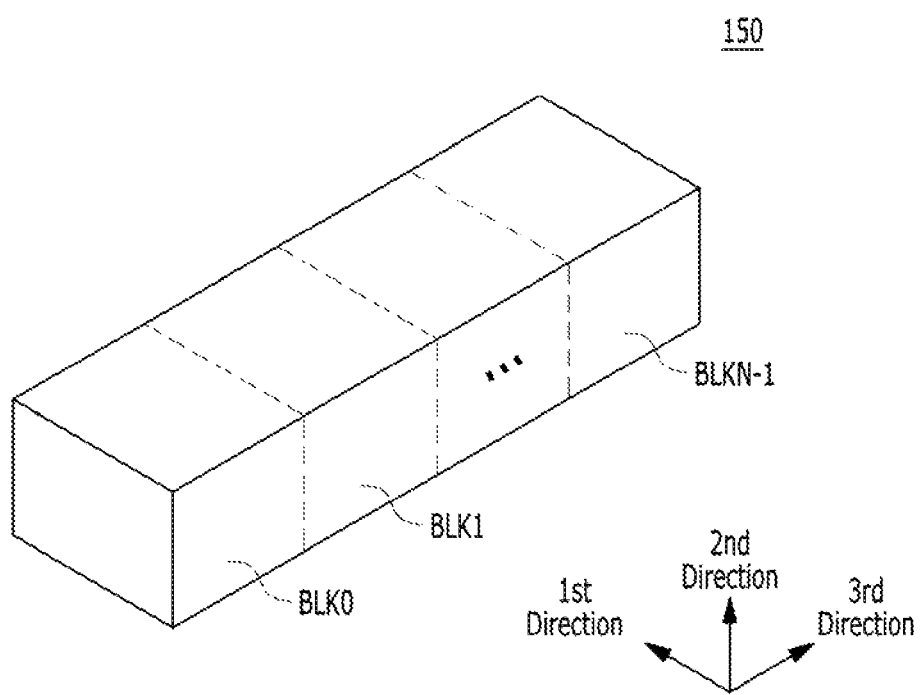
FIG. 4 is a schematic diagram illustrating an exemplary three-dimensional structure of the memory device shown in FIG. 2.

FIG. 4 is a schematic diagram illustrating an exemplary 3D structure of the memory device 150.

The memory device 150 may be embodied by a 2D or 3D memory device. Specifically, as described in reference with FIG. 4, the memory device 150 may be embodied by a nonvolatile memory device having a 3D stack structure. When the memory device 150 has a 3D structure, the memory device 150 may include a plurality of memory blocks BLK0 to BLKN−1 each having a 3D structure (or vertical structure).

Hereinbelow, detailed descriptions will be made with reference to FIGS. 5 to 8, for data processing with respect to the memory device 150 in a memory system in accordance with an embodiment, particularly, a data processing operation in the case of performing a command operation corresponding to a command received from the host 102 and a data management operation.

Also, detailed descriptions will be made with reference to FIGS. 5 to 9 for data processing with respect to a memory device in the memory system in accordance with the embodiment of the present disclosure, in particular, a case of receiving a plurality of commands from the host 102 and performing a plurality of command operations corresponding to the commands.

FIGS. 5 to 8 are schematic diagram illustrating various aspects of the memory system 110 in more detail. FIGS. 5 to 8 assist in the explanation of a case where a plurality of command operations corresponding to a plurality of received commands are performed in a memory system in accordance with an embodiment of the present invention. In an embodiment the controller 130 may receive a plurality of commands from the host 102 and perform command operations corresponding to the received commands in the memory system 110 described in reference with FIG. 1. For example, the plurality of the received commands may be write commands, or read commands, or erase commands, and the controller 130 may perform program operations corresponding to the write commands, or read operations corresponding to the read commands, or erase operations corresponding to the erase commands. In another example, the controller 130 may receive successively a plurality of write commands and a plurality of read commands from the host 102 and may perform program operations and read operations corresponding to the write commands and the read commands, respectively.

In an embodiment of the present disclosure, in the case of receiving a plurality of commands from the host 102 and performing a plurality of command operations corresponding to the commands received from the host 102, the plurality of commands are processed between the host 102 and the controller 130, in the controller 130 and between the controller 130 and the memory device 150, and performing of the command operations corresponding to the commands and performance results corresponding to the performing of the command operations are processed between the memory device 150 and the controller 130, in the controller 130 and between the controller 130 and the host 102. In particular, according to an embodiment of the present invention, the plurality of commands received from the host 102 and the plurality of command operations corresponding to the plurality of commands are respectively processed at a regular latency. In the memory system 110 in accordance with the embodiment of the present disclosure, the controller 130 manages the plurality of commands, the command operations corresponding to the plurality of commands and the performance results of the command operations such that the plurality of commands are transferred to the memory device 150 at a first regular time duration interval, the plurality of command operations corresponding to the plurality of commands are performed in the memory device 150 at a second regular time duration interval and the performance results of the command operations performed in the memory device 150 are provided to the host 102 at a third regular time duration interval.

In an embodiment of the present disclosure, in order to ensure that the plurality of command operations corresponding to the plurality of commands received from the host 102 are performed regularly within a maximum usable power level and voltage/current level, in the memory system 110 including the controller 130 and the memory device 150, a maximum operation clock in the memory system 110 and a maximum temperature level in the memory system 110, transfer of the plurality of commands received from the host 102, requests for performing of the command operations corresponding to the commands and transfer of performance results of the command operations are processed at a regular time duration interval, that is, are performed by being dispersed regularly. In particular, in the memory system in accordance with an embodiment of the present disclosure, the controller 130 receives a plurality of commands from the host 102 through the host interface unit 132 which is driven at the HIL, queues and parses the plurality of commands received from the host 102, and transfers the commands to the flash interface unit which is driven at the FIL. In this regard, the controller 130 transfers the plurality of commands received from the host 102, from the host interface unit 132 to the flash interface unit at a regular time duration interval. According to this fact, the controller 130 requests performing of command operations corresponding to the plurality of commands, through the flash interface unit to the memory device 150 at a regular time duration interval, that is, causes the command operations to be performed at a regular time duration interval in the memory device 150. Further, the controller 130 receives performance results of the command operations from the memory device 150 through the flash interface unit, transfers the performance results of the command operations from the flash interface unit to the host interface unit 132 at a regular time duration interval, and provides the performance results of the command operations to the host 102 through the host interface unit 132 at a regular time duration interval.

That is to say, in the embodiment of the present disclosure, the plurality of commands are received from the host 102 at a regular time duration interval, the plurality of commands received from the host 102 are processed in the controller 130 at a regular time duration interval, performing of the command operations corresponding to the commands is requested to the memory device 150 at a regular time duration interval, and the performance results of the command operations are received from the memory device 150 at a regular time duration interval, are processed in the controller 130 at a regular time duration interval and are provided to the host 102 at a regular time duration interval. According to this fact, in the embodiment of the present disclosure, the plurality of command operations are performed regularly and normally within a maximum usable power level and voltage/current level in the memory system 110 including the controller 130 and the memory device 150, a maximum operation clock in the memory system 110 and a maximum temperature level in the memory system 110. Furthermore, in the case of receiving the plurality of commands from the host 102, operational performance of the memory system 110 may be retained regularly and the command operations may be stably performed in the memory system 110, as a result of which the reliability of the memory system 110 may be improved.

Time duration intervals are defined by processing time durations and idle time durations. That is to say, in the case where a first processing time duration, a first idle time duration, a second processing time duration and a second idle time duration exist by intervals, for example, times, according to repetition of processing time durations and idle time durations, time duration intervals include a processing time duration interval which corresponds to the interval between the first processing time duration and the second processing time duration, that is, the first idle time duration, and an idle time duration interval which corresponds to the interval between the first idle time duration and the second idle time duration, that is, the second processing t me duration. In other words in the processing time durations, there may be included time durations for which the plurality of commands are transferred, that is, processing time durations for which transfer of the commands is performed, processing time durations for which the command operations corresponding to the plurality of commands are performed, and time durations for which the performance results of the command operations are transferred, that is, processing time durations for which transfer of the performance results is performed. In the idle time durations, there may be included idle time durations from after optional operations are performed to before other optional operations are performed, as intervals between processing time durations. For example, in the idle time durations, there may be included idle time durations from after first commands are transferred to before second commands are transferred, idle time durations from after the first commands or the second commands are transferred to before first command operations or second command operations corresponding to the first commands or the second commands are performed, idle time durations from after the first command operations or the second command operations are performed to before first performance results of the first command operations or second performance results of the second command operations are transferred, and idle time durations from after the first performance results are transferred or provided to before the second performance results are transferred or provided.

In an embodiment of the present disclosure, descriptions will be made by taking as an example a case where, after storing write data corresponding to a plurality of write commands received from the host 102, in the buffers/caches included in the memory 144 of the controller 130, the data stored in the buffers/caches are programmed and stored in the plurality of memory blocks included in the memory device 150, that is, program operations are performed, and, after updating map data in correspondence to the program operations for the memory device 150, the updated map data are stored in the plurality of memory blocks included in the memory device 150 that is, a case where program operations corresponding to a plurality of write commands received from the host 102 are performed. Further, in the embodiment of the present disclosure, descriptions will be made by taking as an example a case where, when a plurality of read commands are received from the host 102 for the data stored in the memory device 150, data corresponding to the read commands are read from the memory device 150 by checking map data of the data corresponding to the read commands, and, after storing the read data in the buffers/caches included in the memory 144 of the controller 130, the data stored in the buffers/caches are provided to the host 102, that is, a case where read operations corresponding to a plurality of read commands received from the host 102 are performed. In addition, in the embodiment of the present disclosure, descriptions will be made by taking as an example a case where, when a plurality of erase commands are received from the host 102 for the memory blocks included in the memory device 150, memory blocks corresponding to the erase commands are checked data stored in the checked memory blocks are erased, map data are updated in correspondence to the erased data, and the updated map data are stored in the plurality of memory blocks included in the memory device 150, that is, a case where erase operations corresponding to a plurality of erase commands received from the host 102 are performed. Furthermore, in the embodiment of the present disclosure, descriptions will be made by taking as an example a case where a plurality of program operations, read operations and erase operations are performed by receiving a plurality of write commands, a plurality of read commands and a plurality of erase commands from the host 102.

Further, while, in the present embodiment, it will be described below as an example for the sake of convenience in explanation that the controller 130 performs the command operations in the memory system 110, it is to be noted that, as described above, the processor 134 included in the controller 130 may perform command operations in the memory system 110, through, for example, an FTL (flash translation layer). For example, in the embodiment of the present disclosure, the controller 130 programs and stores user data and metadata corresponding to write commands received from the host 102, in optional memory blocks among the plurality of memory blocks included in the memory device 150, reads user data and metadata corresponding to read commands received from the host 102, from optional memory blocks among the plurality of memory blocks included in the memory device 150, and provides the read data to the host 102, or erases user data and metadata corresponding to erase commands received from the host 102, from optional memory blocks among the plurality of memory blocks included in the memory device 150.

Metadata may include first nap data including a logical/physical (L2P: logical to physical) information (hereinafter, referred to as a 'logical information') and second map data including a physical/logical (P2L: physical to logical) information (hereinafter, referred to as a 'physical information'), for data stored in memory blocks in correspondence to a program operation. Also, the metadata may include an information on command data corresponding to a command received from the host 102, an information on a command operation corresponding to the command, an information on the memory blocks of the memory device 150 for which the command operation is to be performed, and an information on map data corresponding to the command operation. In other words, metadata may include all remaining information and data excluding user data corresponding to a command received from the host 102.

That is, in the embodiment of the present disclosure, the controller 130 performs command operations corresponding to a plurality of commands received from the host, that is performs program operations corresponding to a plurality of write commands, for example, in the case where the write commands are received from the host 102. At this time, user data corresponding to the write commands are written and stored in the memory blocks of the memory device 150, for example, empty memory blocks, open memory blocks or free memory blocks for which an erase operation has been performed, among the memory blocks; and first map data including an L2P map table or an L2P map list in which mapping information between logical addresses and physical addresses for the user data stored in the memory blocks, that is, logical information, are recorded and second map data including a P2L map table or a P2L map list in which mapping information between physical addresses and logical addresses for the memory blocks stored with the user data, that is, physical information, are recorded are written and stored in the empty memory blocks, open memory blocks or the free memory blocks among the memory blocks of the memory device 150.

Here, when receiving write commands from the host 102, the controller 130 writes and stores user data corresponding to the write commands in memory blocks, and stores, in memory blocks, metadata including first map data and second map data for the user data stored in the memory blocks. In particular, in correspondence to that the data segments of the user data are stored in the memory blocks of the memory device 150, the controller 130 generates and updates the meta segments of the metadata, that is, the L2P segments of the first map data and the P2L segments of the second map data as the map segments of map data, and then, stores the map segments in the memory blocks of the memory device 150. At this time, the controller 130 updates the map segments stored in the memory blocks of the memory device 150, by loading them in the memory 144 included in the controller 130.

In particular, in an embodiment of the present disclosure, as described above, a plurality of write commands are received from the host 102 through the host interface unit 132 which is driven at the HIL of the controller 130, and are then transferred to the flash interface unit which is driven at the FIL of the controller 130. In this regard, by checking queue capacities of command queuing modules included in the controller 130, the plurality of write commands are received and transferred. For example, by checking queue capacities of command queuing modules respectively included in the host interface unit 132 at the HIL and the flash interface unit at the FIL, the write commands are received and transferred at a regular time duration interval. In addition, performing of program operations corresponding to the write commands is requested to the memory device 150 at a regular time duration interval. By checking queue capacities of the command queuing modules, performance results of the program operations are transferred and received. For example, by checking queue capacities of the command queuing modules respectively included in the host interface unit 132 at the HIL and the flash interface unit at the FIL the performance results are transferred and received at a regular time duration interval, in particular, the performance results transferred from the memory device 150 are provided to the host 102 at a regular time duration interval.

Further, in the case where a plurality of read commands are received from the host 102, the controller 130 reads read data corresponding to the read commands, from the memory device 150, stores the read data in the buffers/caches included in the memory 144 of the controller 130, and then, provides the data stored in the buffers/caches, to the host 102, by which read operations corresponding to the plurality of read commands are performed.

In particular, in the embodiment of the present disclosure, as described above, a plurality of read commands are received from the host 102 through the host interface unit 132 which is driven at the HIL of the controller 130, and are transferred to the flash interface unit which is driven at the FIL of the controller 130. In this regard, by checking queue capacities of command queuing modules included in the controller 130, the plurality of read commands are received and transferred. For example, by checking queue capacities of command queuing modules respectively included in the host interface unit 132 at the HIL and the flash interface unit at the FIL, the read commands are transferred and received at a regular time duration interval. In addition, in the embodiment of the present disclosure, performing of read operations corresponding to the read commands is requested to the memory device 150 at a regular time duration interval. By checking queue capacities of the command queuing modules, performance results of read operations are transferred and received. For example, by checking queue capacities of the command queuing modules respectively included in the host interface unit 132 at the HIL and the flash interface unit at the FIL, the performance results are transferred and received at a regular time duration interval, in particular, the performance results transferred from the memory device 150, that is, read data corresponding to the read operations, are provided to the host 102 at a regular time duration interval.

In addition, in the case where a plurality of erase commands are received from the host 102, the controller 130 checks memory blocks of the memory device 150 corresponding to the erase commands, and then, performs erase operations for the memory blocks.

In particular, in the embodiment of the present disclosure, as described above, a plurality of erase commands are received from the host 102 through the host interface unit 132 which is driven at the HIL of the controller 130, and are transferred to the flash interface unit which is driven at the FIL of the controller 130. In this regard, by checking queue capacities of command queuing modules included in the controller 130, the plurality of erase commands are transferred and received. For example, by checking queue capacities of command queuing modules respectively included in the host interface unit 132 at the HIL and the flash interface unit at the FIL, the erase commands are transferred and received at a regular time duration interval. In addition, in the embodiment of the present disclosure, performing of erase operations corresponding to the erase commands is requested to the memory device 150 at a regular time duration interval. By checking queue capacities of the command queuing modules, performance results of the erase operations are transferred and received. For example, by checking queue capacities of the command queuing modules respectively included in the host interface unit 132 at the HIL and the flash interface unit at the FIL, the performance results are transferred and received at a regular time duration interval, in particular, the performance results transferred from the memory device 150 are provided to the host 102 at a regular time duration interval. In this way, in the memory system 110 in accordance with an embodiment of the present disclosure, in the case of receiving a plurality of commands, that is, a plurality of write commands, a plurality of read commands and a plurality of erase commands, from the host 102, in particular, in the case of receiving a plurality of commands sequentially and successively, by checking queue capacities of the command queuing modules included therein the plurality of write commands, the plurality of read commands and the plurality of erase commands are processed at a regular time duration interval. Namely, transfer between the host 102 and the controller 130, transfer in the controller 130 and transfer between the controller 130 and the memory device 150 are performed at a regular time duration interval. Moreover, command operations corresponding to the plurality of commands that is, program operations, read operations and erase operations, are performed at a regular time duration interval in the memory device 150. Furthermore, performance results of the program operations, read operations and erase operations are processed at a regular time duration interval. Namely, transfer between the host 102 and the controller 130, transfer in the controller 130 and transfer between the controller 130 and the memory device 150 are performed at a regular time duration interval.

In the memory system 110 in accordance with the embodiment of the present disclosure, not only queue capacities of the command queuing modules included in the controller 130 but also capabilities for command operations in the memory system 110, in particular, the controller 130 and the memory device 150, which performs the command operations, for example, performance capabilities, processing capabilities, processing speeds and processing latencies for the command operations, are predicted, and then, in consideration of the capabilities in the memory system 110, commands are processed, command operations are performed and performance results of the command operations are processed at a regular time duration interval as described above. Hereinbelow, detailed descriptions will be made with reference to FIGS. 5 to 8 for performing of command operations corresponding to a plurality of commands in the memory system in accordance with the embodiment.

Figure 5:
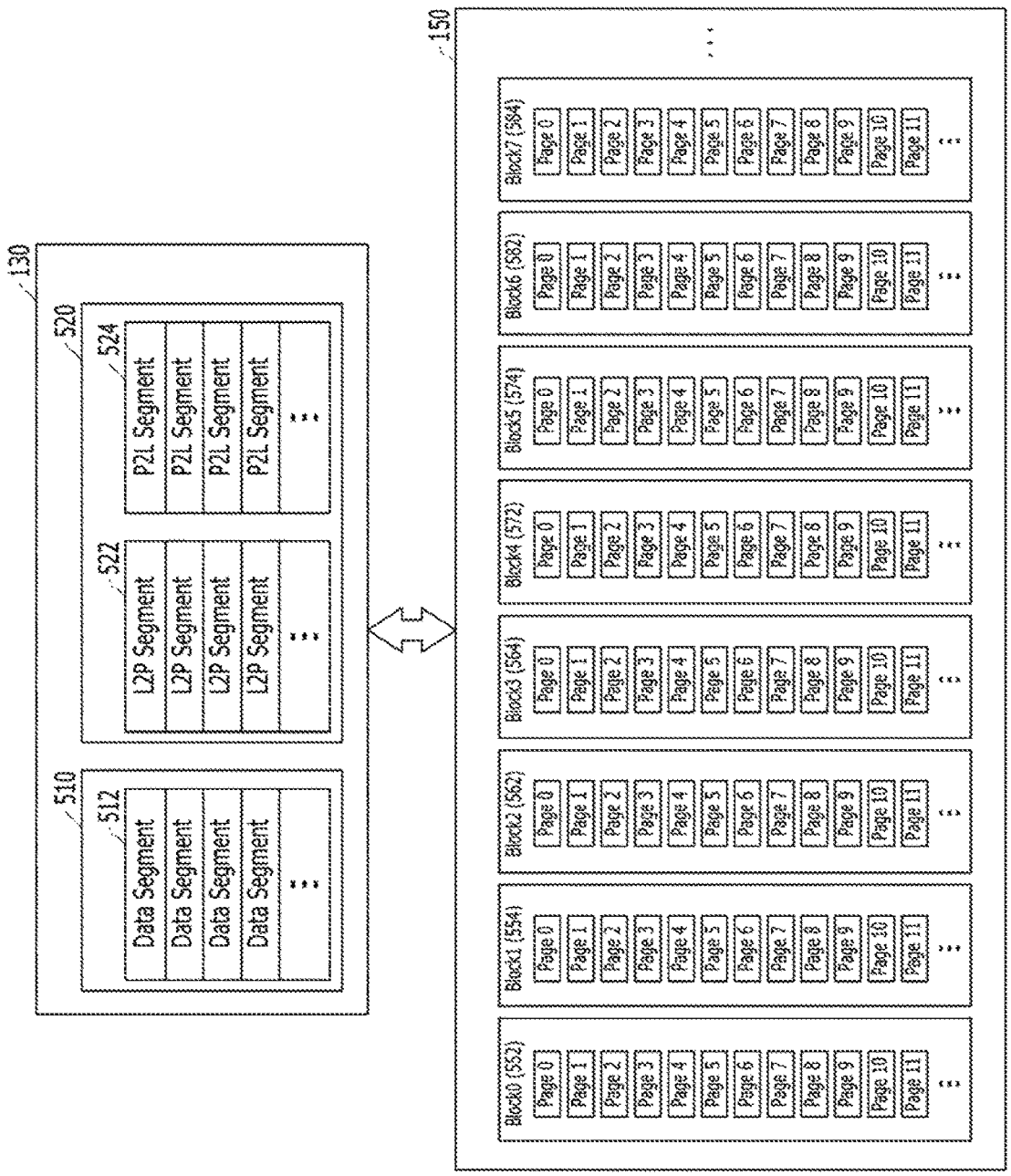
FIG. 5 is a schematic diagram of an exemplary configuration of a memory system including a memory controller and a memory device, in accordance with an embodiment of the present invention.

First, referring to FIG. 5, the controller 130 performs command operations corresponding to a plurality of commands received from the host 102, for example, program operations corresponding to a plurality of write commands received from the host 102. At this time, the controller 130 programs and stores user data corresponding to the write commands, in memory blocks 552, 554, 562, 564, 572, 574, 582 and 584 of the memory device 150. Also, in correspondence to the program operation to the memory blocks 552, 554, 562, 564, 572, 574, 582 and 584, the controller 130 generates and updates metadata for the user data and stores the metadata in the memory blocks 552, 554, 562, 564, 572, 574, 582 and 584 of the memory device 150.

The controller 130 generates and updates information indicating that the user data are stored in the pages included in the memory blocks 552, 554, 562, 564, 572, 574, 582 and 584 of the memory device 150, for example, first map data and second map data, that is, generates and updates the logical segments of the first map data, that is, L2P segments, and the physical segments of the second map data, that is, P2L segments, and then, stores the L2P segments and the P2L segments in the pages, included in the memory blocks 552, 554, 562, 564, 572, 574, 582 and 584 of the memory device 150.

For example, the controller 130 caches and buffers the user data corresponding to the write commands received from the host 102, in a first buffer 510 included in the memory 144 of the controller 130, that is, stores data segments 512 of the user data in the first buffer 510 as a data buffer/cache. Then, the controller 130 stores the data segments 512 stored in the first buffer 510, in the pages included in the memory blocks 552, 554, 562, 564, 572, 574, 582 and 584 of the memory device 150. As the data segments 512 of the user data corresponding to the write commands received from the host 102 are programmed and stored in the pages included in the memory blocks 552, 554, 562, 564, 572, 574, 582 and 584 of the memory device 150, the controller 130 generates and updates the first map data and the second map data, and stores the first map data and the second map data in a second buffer 520 included in the memory 144 of the controller 130. Namely, the controller 130 stores L2P segments 522 of the first map data for the user data and P2L segments 524 of the second map data for the user data, in the second buffer 520 as a map buffer/cache. In the second buffer 520 in the memory 144 of the controller 130, there may be stored, as described above, the L2P segments 522 of the first map data and the P2L segments 524 of the second map data, or there may be stored a map list for the L2P segments 522 of the first map data and a map list for the P2L segments 524 of the second map data. The controller 130 stores the L2P segments 522 of the first map data and the P2L segments 524 of the second map data which are stored in the second buffer 520, in the pages included in the memory blocks 552, 554, 562, 564, 572, 574, 582 and 584 of the memory device 150.

Also, the controller 130 performs command operations corresponding to a plurality of commands received from the host 102, for example, read operations corresponding to a plurality of read commands received from the host 102. At this time, the controller 130 loads the map segments of user data corresponding to the read commands, for example, L2P segments 522 of first map data and P2L segments 524 of second map data in the second buffer 520, and checks the L2P segments 522 and the P2L segments 524. After that, the controller 130 reads the user data stored in the pages of corresponding memory blocks among the memory blocks 552, 554, 562, 564, 572, 574, 582 and 584 of the memory device 150, stores data segments 512 of the read user data in the first buffer 510, and provides the data segments 512 to the host 102.

Furthermore, the controller 130 performs command operations corresponding to a plurality of commands received from the host 102, for example, erase operations corresponding to a plurality of erase commands received from the host 102. At this time, the controller 130 checks memory blocks corresponding to the erase commands among the memory blocks 552, 554, 562, 564, 572, 574, 582 and 584 of the memory device 150, and performs the erase operations for the checked memory blocks.

Figure 6:
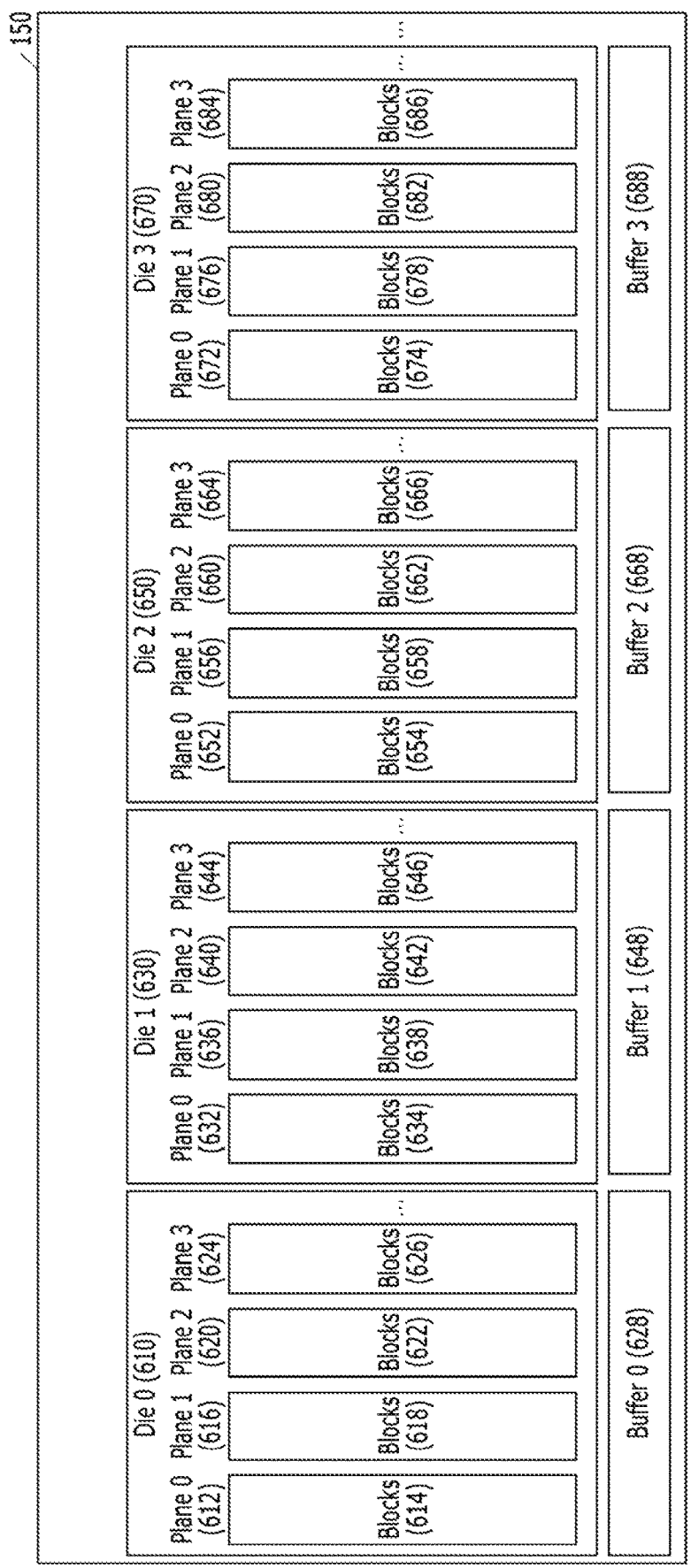
FIG. 6 is a schematic diagram of a memory device including a plurality of dies, planes, blocks and buffers, in accordance with an embodiment of the present invention.

Referring to FIG. 6, the memory device 150 includes a plurality of memory dies, for example, a memory die 0 610, a memory die 1 630, a memory die 2 650 and a memory die 3 670. Each of the memory dies 610, 630, 650 and 670 includes a plurality of planes. For example, the memory die 0 610 includes a plane 0 612, a plane 1 616, a plane 2 620 and a plane 3 624, the memory die 1 630 includes a plane 0 632, a plane 1 636, a plane 2 640 and a plane 3 644, the memory die 2 650 includes a plane 0 652, a plane 1 656, a plane 2 660 and a plane 3 664, and the memory die 3 670 includes a plane 0 672, a plane 1 676 a plane 2 680 and a plane 3 684. The respective planes 612, 616, 620, 624, 632, 636, 640, 644, 652, 656, 660, 664, 672, 676, 680 and 684 in the memory dies 610, 630, 650 and 670 included in the memory device 150 include a plurality of memory blocks 614, 618, 622, 626, 634, 638, 642, 646, 654, 658, 662, 666, 674, 678, 682 and 686, for example, N number of blocks Block0, Block1, . . . and BlockN−1 each including a plurality of pages, for example, 2^M number of pages, as described above with reference to FIG. 2. Moreover, the memory device 150 includes a plurality of buffers corresponding to the respective memory dies 610, 630, 650 and 670, for example, a buffer 0 628 corresponding to the memory die 0 610, a buffer 1 648 corresponding to the memory die 1 630, a buffer 2 668 corresponding to the memory die 2 650, and a buffer 3 688 corresponding to the memory die 3 670.

In the case of performing command operations corresponding to a plurality of commands received from the host 102, data corresponding to the command operations are stored in the buffers 628, 648, 668 and 688 included in the memory device 150. For example, in the case of performing program operations, data corresponding to the program operations are stored in the buffers 628, 648, 668 and 688, and are then stored in the pages included in the memory blocks of the memory dies 610, 630, 650 and 670. In the case of performing read operations, data corresponding to the read operations are read from the pages included in the memory blocks of the memory dies 610, 630, 650 and 670, are stored in the buffers 628, 648, 668 and 688, and are then provided to the host 102 through the controller 130.

In the embodiment of the present disclosure, while it will be described below as an example for the sake of convenience in explanation that the buffers 628, 648, 668 and 688 included in the memory device 150 exist outside the respective corresponding memory dies 610, 630, 650 and 670, it is to be noted that the buffers 628, 648, 668 and 688 may exist inside the respective corresponding memory dies 610, 630, 650 and 670, and it is to be noted that the buffers 628, 648, 668 and 688 may correspond to the respective planes 612, 616, 620, 624, 632, 636, 640, 644, 652, 656, 660, 664, 672, 676, 680 and 684 or the respective memory blocks 614, 618, 622, 626, 634, 638, 642, 646, 654, 658, 662, 666, 674, 678, 682 and 686 in the respective memory dies 610, 630, 650 and 670. Further, in the embodiment of the present disclosure, while it will be described below as an example for the sake of convenience in explanation that the buffers 628, 648, 668 and 688 included in the memory device 150 are the plurality of page buffers 322, 324 and 326 included in the memory device 150 as described above with reference to FIG. 3, it is to be noted that the buffers 628, 648, 668 and 688 may be a plurality of caches or a plurality of registers included in the memory device 150. Hereinbelow, detailed descriptions will be made with reference to FIG. 7, through an example, for processing of a plurality of commands from the host 102, performing of a plurality of command operations corresponding to the plurality of commands and processing of performance results of the command operations, in the case where, in the memory system in accordance with the embodiment of the present disclosure, the plurality of commands are received from the host 102, for example, a plurality of write commands are received, a plurality of read commands are received, a plurality of erase commands are received or a plurality of write commands, a plurality of read commands and a plurality of erase commands are received.

Figure 7:
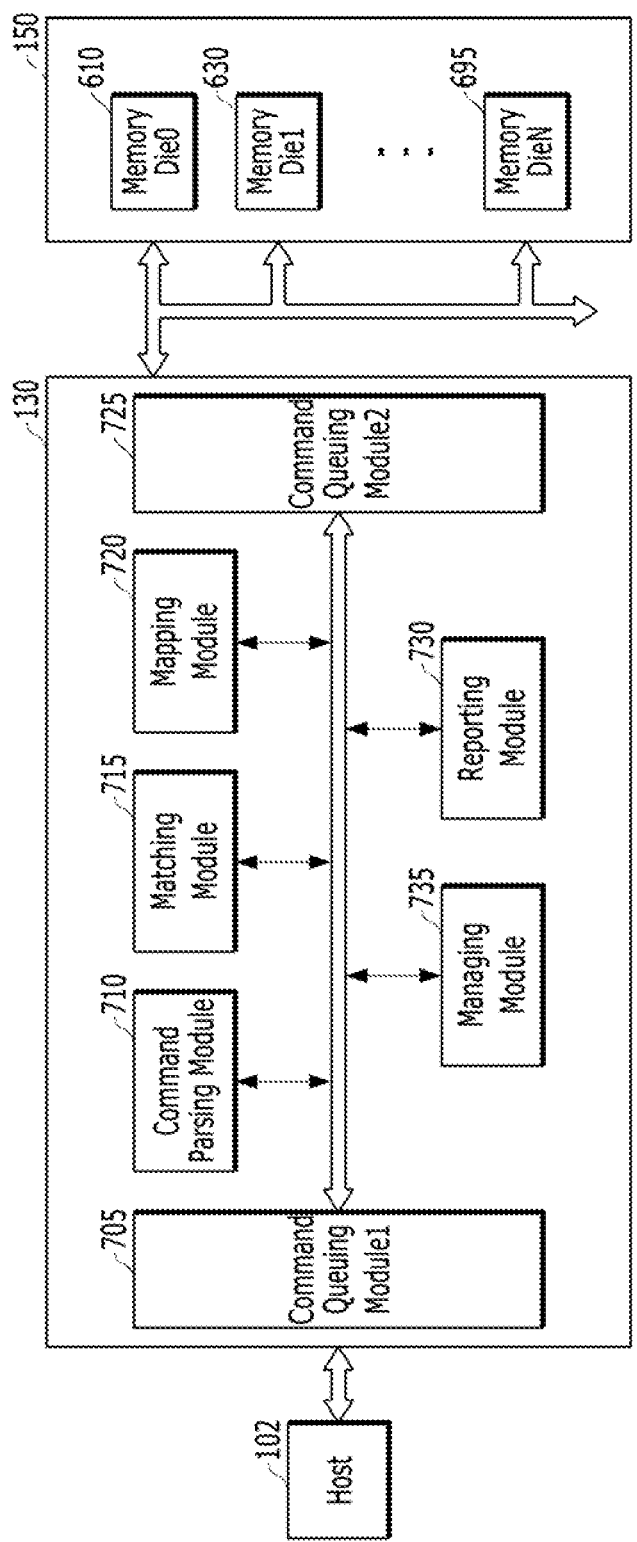
FIG. 7 is a simplified block diagram of a data processing system illustrating exemplary configurations a controller and a memory device employed in the data processing system, in accordance with an embodiment of the present invention.

Referring to FIG. 7, the controller 130 receives a plurality of commands from the host 102, for example, write commands, read commands or erase commands, through the host interface unit 132 which is driven at the HIL. Then, the controller 130 queues the plurality of commands in a first command queueing module 705. The first command queueing module 705 may be included in the host interface unit 132. The controller 30 parses the commands queued in the first command queueing module 705, through a command parsing module 710, checks alignment of the parsed commands, through a matching module 715, and maps the addresses of the commands through a mapping module 720. Also, the controller 130 requests performing of command operations corresponding to the plurality of received commands, to the memory device 150 through the flash interface unit which is driven at the FIL. In particular, the controller 130 queues requests for performing of the command operations, through queuing of the commands in a second command queueing module 725 included in the flash interface unit, and then, transfers the requests to the memory device 150.

The controller 130 receives operation results of the command operations to the memory device 150 from the memory device 150 through the flash interface unit. In particular, the controller 130 receives the operation results, and then, queues the operation results in the second command queueing module 725. In order to provide to the host 102 the operation results queued in the second command queueing module 725, the controller 130 transfers the operation results to the first command queueing module 705 included in the host interface unit 132 through a reporting module 730. The controller 130 queues the operation results in the first command queueing module 705, and then, protides the operation results to the host 102.

A managing module 735 of the controller 130 manages and processes reception of the commands from the host 102 and transfer of the commands to the second command queueing module 725, transfer of requests for performing of the command operations and reception of the operation results in the second command queueing module 725. The managing module 735 of the controller 130 manages and processes transfer of the requests for performing of the command operations, to the memory device 150, and reception of the operation results from the memory device 150, and providing of the operation results to the host 102. The managing module 735 of the controller 130 manages and processes transfer of the operation results from the second command queueing module 725 to the first command queueing module 705 and transfer of the operation results from the second command queueing module 725 to the host 102.

As described above, the host interface unit 132 may perform an interface operation of processing commands and data which are transferred and received between the host 102 and the memory system 110, in particular, between the host 102 and the controller 130, and the flash interface unit may perform an interface operation of processing commands and data between the controller 130 and the memory device 150. Specifically, the flash interface unit may be included in the NFC 142. Moreover, while it is illustrated as an example in the embodiment of the present disclosure for the sake of convenience in explanation that the command queuing modules 705 and 725 are included in the interface units, it is to be noted that the first command queueing module 705 of the command queuing modules 705 and 725 may be included in the HIL as an HIL command queue, the second command queueing module 725 of the command queuing modules 705 and 725 may be included in the FIL as an FIL command queue and the command queuing modules 705 and 725 may respectively include and manage a buffer at the HIL and a buffer at the FIL. Namely, the command queuing modules 705 and 725 respectively include HIL command queues and FIL command queues which queue a plurality commands and operation results of command operations. The commands are processed, the command operations are performed and then the operation results are processed with both of respective uniform durations and uniform intervals therebetween as described above, in correspondence to queue capacities of the HIL command queues and the FIL command queues and capabilities for the command operations, in particular, the controller 130 and the memory device 150, for example, performance capabilities, processing capabilities, processing speeds and processing latencies for the command operations.

In detail, the controller 130 receives a plurality of commands from the host 102 through the first command queueing module 705. In particular, the controller 130 receives the plurality of commands and then queues the commands in the first command queueing module 705 in correspondence to a queue capacity of the first command queueing module 705 and capabilities for the plurality of commands. The first command queueing module 705 of the controller 130 initially receives the plurality of commands according to a maximum queue capacity of the first command queueing module 705, and then, transfers the plurality of commands, to the second command queueing module 725 at a regular time duration interval in correspondence to a queue capacity of the second command queueing module 725 and capabilities. Then the first command queueing module 705 checks a queue capacity of the first command queueing module 705 in correspondence to the transfer of commands to the second command queueing module 725, and then receives a plurality of commands from the host 102 at a regular time duration interval in correspondence to the queue capacity of the first command queueing module 705.

The controller 130 queues commands, which are transferred at a regular time duration interval from the first command queueing module 705, through the second command queueing module 725, and requests performing of command operations, to the memory device 150 at a regular time duration interval. That is to say, the second command queueing module 725 of the controller 130 queues the commands received from the first command queueing module 705 at a regular time duration interval, queues the requests for performing of the command operations, and transfers the requests to the memory device 150, that transfers the requests for performing of the command operations, to the memory device 150 at a regular time duration interval. Thus, the controller 130 requests that the command operations be performed at a regular time duration to the memory device 150, and receives operation results performed in the plurality of memory dies included in the memory device 150, through the second command queueing module 725. The second command queueing module 725 of the controller 130 receives the operation results from the memory device 150 at a regular time duration interval in correspondence to a queue capacity of the second command queueing module 725 and capabilities, and then transfers the operation results to the first command queueing module 705. In particular, the second command queueing module 725 queues the operation results received from the memory device 150, in correspondence to a queue capacity of the first command queueing module 705 and capabilities, and then transfers the operation results to the first command queueing module 705 at a regular time duration interval.

The controller 130 provides the operation results of the command operations in to the memory device 150, to the host 102, through the first command queueing module 705. The first command queueing module 705 of the controller 130 queues the operation results transferred from the second command queueing module 725 at a regular time duration interval, and then transfers the operation results to the host 102 at a regular time duration interval in correspondence to a queue capacity of the first command queueing module 705 and capabilities.

The regular time duration intervals at each different stage may be different.

In other words, as described above, the controller 130 receives a plurality of commands from the host 102 at a regular time duration interval in correspondence to queue capacities of the command queuing modules 705 and 725 and capabilities for the plurality of commands in the memory system 110, in particular, capabilities for command operations corresponding to the plurality of commands in the controller 130 and the memory device 150 which perform the command operations, processes the plurality of commands received from the host 102 at a regular time duration interval depending on queue capacities of the command queuing modules 705 and 725 and capabilities in the memory system 110, performs the command operations corresponding to the commands in the memory device 150, processes performance results of the command operations at a regular time duration interval depending on queue capacities of the command queuing modules 705 and 725 and capabilities in the memory system 110, and provides the performance results of the command operations to the host 102.

The controller 130 checks the command operations corresponding to the plurality of commands through the command parsing module 710, and then, predicts capabilities for the plurality of commands in the memory system 110, in particular, capabilities for the command operations corresponding to the plurality of commands in the controller 130 and the memory device 150 which perform the command operations, for example, performance capabilities, processing capabilities, processing speeds and processing latencies for the command operations. Further, the controller 130 sets time duration intervals depending on queue capacities of the command queuing modules 705 and 725 and capabilities in the memory system 110, for example, sets processing time durations and idle time durations for the plurality of commands received f the host 102 and the command operations corresponding to the commands.

Hereinbelow, detailed descriptions will be made with reference to FIG. 8, through an example, for performing of a plurality of commands received from the host 102 and command operations corresponding to the plurality of commands and processing of performance results of the command operations at a regular time duration interval, in the memory system 110 in accordance with an embodiment of the present disclosure. In the embodiment of the present disclosure, for the sake of convenience in explanation, detailed descriptions will be made below by taking, as an example, a case where 1000 commands are transferred from the host 102, a maximum queue capacity in the command queuing modules 705 and 725 is a size corresponding to 100 commands, a processing time duration and an idle time duration corresponding to queue capacities of the command queuing modules 705 and 725 and capabilities for the commands in the memory system 110 have a size corresponding to 20 commands. Namely, the controller 130 in the memory system 110 in accordance with the embodiment of the present disclosure sets regularly a time duration interval in correspondence to the queue capacities of the command queuing modules 705 and 725 and the capabilities for the plurality of commands received from the host 102, in the memory system 110, for example, sets a regular time duration interval of a size corresponding to 20 commands.

Figure 8:
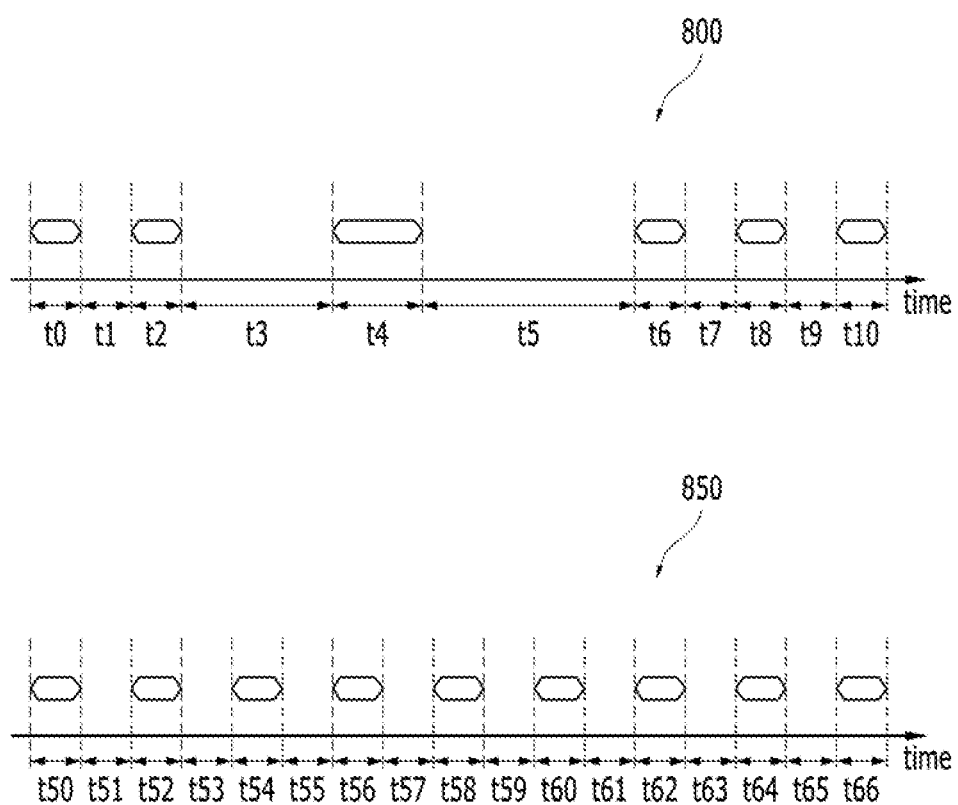
FIG. 8 illustrates time diagrams of an operation of a memory system, in accordance with an embodiment of the present invention.

Referring to FIG. 8, the controller 130 receives a plurality of commands from the host 102 in correspondence to queue capacities of the command queuing modules 705 and 725 and capabilities for the commands in the memory system 110, through the command queuing modules 705 and 725. As described above, the controller 130 receives a plurality of commands, for example, 100 commands, from the host 102, initially in correspondence to the maximum queue capacity of the command queuing modules 705 and 725. The controller 130 queues the plurality of commands received from the host 102, in the command queuing modules 705 and 725, requests performing of command operations corresponding to commands, to the memory device 150, receives and queues performance results of the command operations performed in the memory device 150, through the command queuing modules 705 and 725, and provides the performance results of the command operations to the host 102.

For example, in a case 800 where the controller 130 receives a plurality of commands from the host 102 in correspondence to a maximum queue capacity of the command queuing modules 705 and 725 and a plurality of commands are received from the host 102 in correspondence to processing of the commands in the controller 130, in particular, transfer of requests for performing of command operations corresponding to the commands, from the command queuing modules 705 and 725 to the memory device 150, the plurality of commands received from the host 102 are processed at an irregular latency. In particular, in the case 800 where the controller 130 receives and processes a plurality of commands from the host 102 in correspondence to queue capacities usable in the command queueing modules 705 and 725 according to processing of the plurality of commands received from the host 102, in the controller 130, that is, according to transfer of requests for performing of command operations, to the memory device 150, the plurality of commands are processed in the controller 130 at an irregular time duration interval, requests for performing of the command operations corresponding to the commands are transferred to the memory device 150 at an irregular time duration interval, and performance results of the command operations in the memory device 150 are provided to the host 102 at an irregular time duration interval.

Time duration intervals for the plurality of commands received from the host 102 and the command operations corresponding to the commands, that is, processing time durations t0, t2, t4, t6, t8 and t10 and idle time durations t1, t3, t5, t7 and t9 for the plurality of commands and the command operations exist irregularly, and accordingly, processing of the plurality of commands received from the host 102, in the controller 130, performing of the command operations in the memory device 150 and providing of the performance results of the command operations to the host 102 are performed by being dispersed irregularly. In particular, in the case 800 where the controller 130 receives and processes a plurality of commands from the host 102 in correspondence to usable queue capacities in the command queuing modules 705 and 725, latencies increase in certain time duration intervals. For example, the processing time duration t4, the idle time duration t3 and the idle time duration t5 increase when compared to the other processing time durations and idle time durations. The certain time duration intervals increased in this way, that is, the processing time duration t4, the idle time duration t3 and the idle time duration t5, become bottleneck time durations, in particular, bottleneck time durations for the command operations, when performing the command operations in the memory system 110. As a result, in the bottleneck time durations, the memory system 110 operates abnormally and unstably, and the operational performance of the memory system 110 is degraded.

On the other hand, in a case 850 where the controller 130 receives a plurality of commands from the host 102 in correspondence to queue capacities of the command queuing modules 705 and 725 and capabilities for the commands in the memory system 110 and then processes the commands in the controller 130, the plurality of commands are processed at a regular latency i.e., a uniform latency.

In other words, the controller 130 in the memory system 110 in accordance with the embodiment of the present disclosure receives a plurality of commands from the host 102, requests, to the memory device 150, performing of command operations corresponding to the commands, and provides operation results of the command operations to the host 102, at a regular latency, that is, at a regular time duration interval, in correspondence to queue capacities of the command queuing modules 705 and 725 and capabilities for the commands in the memory system 110.

For example, as described above, the controller 130 receives a plurality of commands, for example, 100 commands, from the host 102, initially in correspondence to a maximum queue capacity of the first command queueing module 705. The controller 130 queues the 100 commands in the first command queueing module 705, and then, transfers 20 commands from the first command queueing module 705 to the second command queueing module 725 in correspondence to the queue capacity of the second command queueing module 725 and processing capabilities of the memory system 110 for the commands. As the 20 commands are transferred from the first command queueing module 705 to the second command queueing module 725, since the now available queue capacity of the first command queueing module 705 has a size corresponding to 20 commands, the controller 130 further receives additional 20 commands through the first command queueing module 705 in correspondence to the available queue capacity of the first command queueing module 705, and the processing capabilities of the memory system 110 for the commands.

The controller 130 queues the 20 commands, which are received from the first command queueing module 705, into the second command queueing module 725, and requests the memory device 150 to perform command operations corresponding to the 20 commands in correspondence to the queue capacity of the second command queueing module 725, and processing capabilities of the memory system 110 for the commands.

That is, the controller 130 transfers requests for performing the 20 command operations to the memory device 150 from the second command queueing module 725. As the requests for performing the 20 command operations are transferred from the second command queueing module 725 to the memory device 150, since available queue capacity to the second command queueing module 725 has a size corresponding to the 20 commands, the controller 130 transfers 20 commands from the first command queueing module 705 to the second command queueing module 725 in correspondence to the available queue capacity of the second command queueing module 725, and processing capabilities of the memory system 110 for the commands.

The memory device 150 performs the 20 command operations in correspondence to the requests for performing the 20 command operations transferred from the controller 130, and the controller 130 receives operation results of the 20 command operations from the memory device 150 through the second command queueing module 725. The controller 130 receives operation results from the memory device 150 through the second command queueing module 725 in correspondence to the available queue capacity of the second command queueing module 725 and processing capabilities of the memory system 110 for the commands.

The controller 130 queues the operation results into the second command queueing module 725, and transfers the operation results of the 20 command operations from the second command queueing module 725 to the first command queueing module 705 in correspondence to the available queue capacity of the first command queueing module 705 and processing capabilities of the memory system 110 for the commands. As the operation results of the 20 command operations are transferred from the second command queueing module 725 to the first command queueing module 705, since available queue capacity to the second command queueing module 725 has a size corresponding to operation results of 20 command operations, the controller 130 receives operation results of 20 command operations from the memory device 150 to the second command queueing module 725 in correspondence to the available queue capacity of the second command queueing module 725 and processing capabilities of the memory system 110 for the commands.

The controller 130 queues the operation results of the 20 command operations of the second command queueing module 725 into the first command queueing module 705, and transfers the operation results of the 20 command operations to the host 102 in correspondence to the available queue capacity of the first command queueing module 705 and processing capabilities of the memory system 110 for the commands. In other words, the controller 130 provides operation results of command operations, from the first command queueing module 705 to the host 102 in correspondence to queue capacities of the command queuing modules 705 and 725 and processing capabilities of the memory system 110 for the commands. As the operation results of the 20 command operations are transferred from the first command queueing module 705 to the host 102, since available queue capacity to the first command queueing module 705 has a size corresponding to operation results of 20 command operations, the controller 130 transfers operation results of 20 command operations from the second command queueing module 725 to the first command queueing module 705 in correspondence to the available queue capacity of the first command queueing module 705 and processing capabilities of the memory system 110 for the commands.

In this way, the controller 130 processes a plurality of commands with respective uniform latencies thereof and then provides operation results to the host 102 in correspondence to queue capacities of the command queuing modules 705 and 725 and processing capabilities of the memory system 110 for the commands. In particular, reception of a plurality of commands, request for performing of command operations to the memory device 150, and transfer of operation results are processed and performed respectively at a regular time duration interval.

Namely, time duration intervals for a plurality of commands received from the host 102 and command operations corresponding to the commands, that is, processing time durations t50, t52, t54, t56, t58, t60, t62, t64 and t66 and idle time durations t51, t53, t55, t57, t59, t61, t63 and t65 for the plurality of commands and the command operations exist regularly, for example, exist regularly respectively as time durations of a size corresponding to each of 20 commands, and accordingly, processing of the plurality of commands received from the host 102, in the controller 130, performing of command operations in the memory device 150 and providing of performance results of the command operations to the host 102 are performed by being dispersed regularly. Therefore, in the embodiment of the present disclosure, a plurality of command operations are performed regularly within a maximum usable power level and voltage/current level, a maximum operation clock and a maximum temperature level. Furthermore, in the case of receiving a plurality of commands, operational performance of the memory system 110 may be retained regularly, and command operations may be stably performed as a result of which the reliability of the memory system 110 may be improved. Hereinbelow, an operation for processing commands in the case where a plurality of commands are received in a memory system in accordance with an embodiment of the present disclosure will be described below in detail with reference to FIG. 9.

Figure 9:
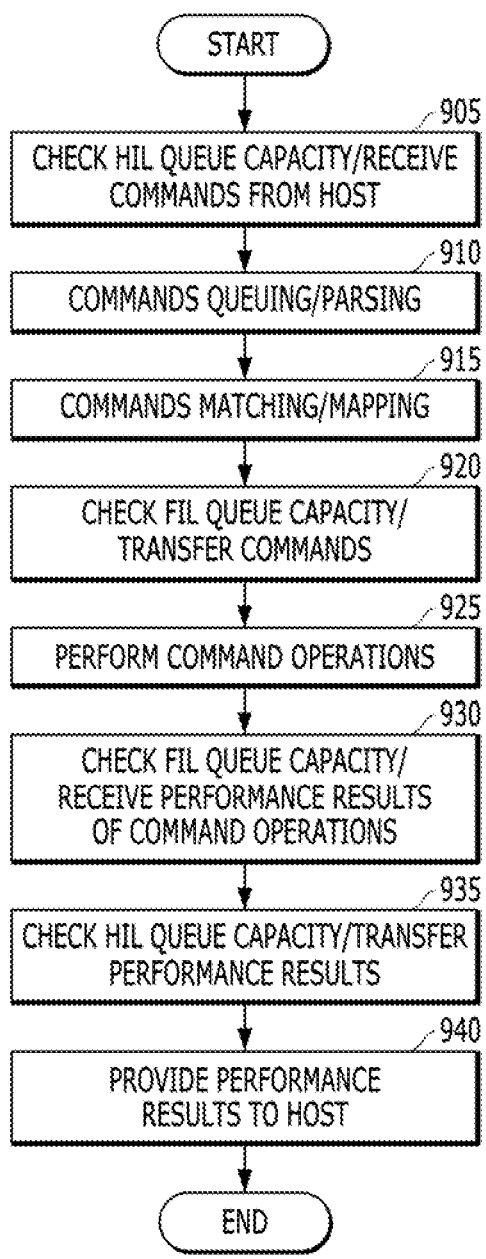
FIG. 9 is a flow chart of an operation of a memory system, in accordance with an embodiment of the present invention.

FIG. 9 is a flow chart of an operation process for processing a plurality of commands in the case where the plurality of commands are received in a memory system, in accordance with an embodiment.

Referring to FIG. 9, at step 905, the memory system 110 checks command queue capacities of command queueing modules included in the controller 130 of the memory system 110, in particular, a command queue capacity at an interface which processes commands and data with respect to the host 102, that is, a queue capacity at an HIL, and then, receives a plurality of commands in correspondence to the queue capacity at the HIL and processing capabilities of the memory system 110 for the commands. While a plurality of commands are initially received from the host 102 in correspondence to a maximum queue capacity at the HIL a plurality of commands are then received from the host 102 at a regular time duration interval in correspondence to a queue capacity at the HIL and processing capabilities in the memory system 110.

At step 910, the commands received from the host 102 are queued and parsed. At step 915, the pared commands are matched and mapped, that is alignment of the parsed commands is checked and then addresses are mapped.

At step 920, a queue capacity at an FIL, is checked, and then, a plurality of commands are transferred from a queue at the HIL to a queue at the FIL, that is, performing of the command operations which correspond to the plurality of commands is requested to the memory device 150 through the queue at the FIL in correspondence to the queue capacity at the FIL and processing capabilities of the memory system 110 for the commands. Requests for performing of the command operations are transferred to the memory device 150 at a regular time duration interval in correspondence to the queue capacity at the FIL and the capabilities in the memory system 110.

At step 925, in correspondence to the requests for performing of the command operations, the command operations are performed at a regular time duration interval in the memory device 150.

At step 930, after checking a queue capacity at the FIL, operation results are received from the memory device 150 in correspondence to the queue capacity at the FIL and capabilities. The operation results are received from the memory device 150 with both of another uniform duration and an uniform interval therebetween in correspondence to the queue capacity at the FIL and the processing capabilities of the memory system 110 for the commands.

At step 935, after checking a queue capacity at the HIL, the operation results are transferred from a queue at the FIL to a queue at the HIL in correspondence to the queue capacity at the HIL and processing capabilities of the memory system 110 for the commands. At step 940, the operation results are provided to the host 102 through a queue at the HIL. The operation results of the command operations corresponding to the plurality of commands are provided to the host 102 at a regular time duration interval in correspondence to the queue capacity at the HIL and the processing capabilities in the memory system 110.

FIGS. 10 to 18 are diagrams schematically illustrating application examples of the data processing system of FIG. 1.

Figure 10:
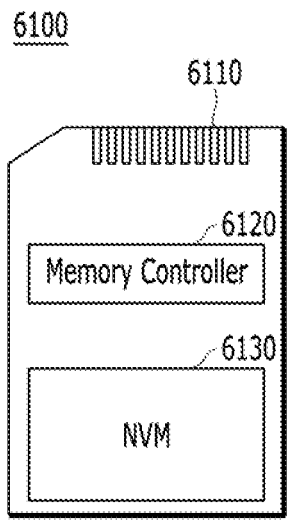
FIGS. 10 to 18 are diagrams schematically illustrating application examples of the data processing system shown in FIG. 1.

FIG. 10 is a diagram schematically illustrating another example of the data processing system including the memory system in accordance with an embodiment. FIG. 10 schematically illustrates a memory card system to which the memory system in accordance with an embodiment is applied.

Referring to FIG. 10 the memory card system 6100 may include a memory controller 6120, a memory device 6130 and a connector 6110.

More specifically, the memory controller 6120 may be connected to the memory device 6130 embodied by a nonvolatile memory, and configured to access the memory device 6130. For example, the memory controller 6120 may be configured to control read, write, erase and background operations of the memory device 6130. The memory controller 6120 may be configured to provide an interface between the memory device 6130 and a host, and drive firmware for controlling the memory device 6130. That is, the memory controller 6120 may correspond to the controller 130 of the memory system 110 described with reference to FIGS. 1 to 9, and the memory device 6130 may correspond to the memory device 150 of the memory system 110 described with reference to FIGS. 1 to 9.

Thus, the memory controller 6120 may include a RAM, a processing unit, a host interface, a memory interface and an error correction unit. The memory controller 130 may further include the elements shown in FIG. 5.

The memory controller 6120 may communicate with an external device, for example, the host 102 of FIG. 1 through the connector 6110. For example, as described with reference to FIG. 1, the memory controller 6120 may be configured to communicate with an external device through one or more of various communication protocols such as universal serial bus (USB), multimedia card (MMC), embedded MMC (eMMC), peripheral component interconnection (PCI), PCI express (PCIe), Advanced Technology Attachment (ATA), Serial-ATA, Parallel-ATA, small computer system interface (SCSI), enhanced small disk interface (EDSI), Integrated Drive Electronics (IDE), Firewire, universal flash storage (UFS), WIFI and Bluetooth. Thus, the memory system and the data processing system in accordance with an embodiment may be applied to wired/wireless electronic devices or particularly mobile electronic devices.

The memory device 6130 may be implemented by a nonvolatile memory. For example, the memory device 6130 may be implemented by various nonvolatile memory devices such as an erasable and programmable ROM (EPROM), an electrically erasable and programmable ROM (EEPROM), a NAND flash memory, a NOR flash memory, a phase-change RAM (PRAM), a resistive RAM (ReRAM), a ferroelectric RAM (FRAM) and a spin torque transfer magnetic RAM (STT-RAM). The memory device 6130 may include a plurality of dies as in the memory device 150 of FIG. 5.

The memory controller 6120 and the memory device 6130 may be integrated into a single semiconductor device. For example, the memory controller 6120 and the memory device 6130 may construct a solid state driver (SSD) by being integrated into a single semiconductor device. Also, the memory controller 6120 and the memory device 6130 may construct a memory card such as a PC card (PCMCIA: Personal Computer Memory Card International Association), a compact flash (CF) card, a smart media card (e.g. SM and SMC), a memory stick, a multimedia card (e.g., MMC, RS-MMC, MMCmicro and eMMC), an SD card (e.g., SD, miniSD, microSD and SDHC) and a universal flash storage (UFS).

Figure 11:
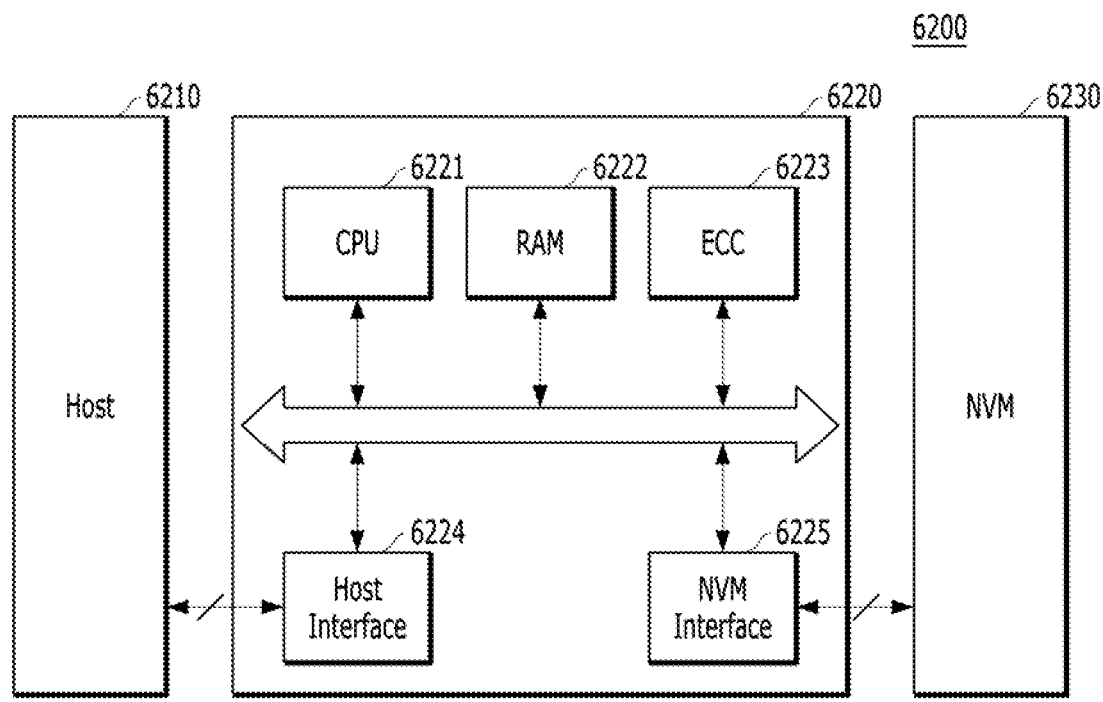

FIG. 11 is a diagram schematically illustrating another example of the data processing system including the memory system in accordance with an embodiment.

Referring to FIG. 11, the data processing system 6200 may include a memory device 6230 having one or more nonvolatile memories and a memory controller 6220 for controlling the memory device 6230. The data processing system 6200 described in reference with FIG. 11 may serve as a storage medium such as a memory card (CF, SD, micro-SD or the like) or USB device, as described with reference to FIG. 1. The memory device 6230 may correspond to the memory device 150 described in reference with FIGS. 1 to 9, and the memory controller 6220 may correspond to the controller 130 described in reference with FIGS. 1 to 9.

The memory controller 6220 may control a read, write or erase operation on the memory device 6230 in response to a request of the host 6210, and the memory controller 6220 may include one or more CPUs 6221, a buffer memory such as RAM 6222, an ECC circuit 6223, a host interface 6224 and a memory interface such as an NVM interface 6225.

The CPU 6221 may control overall operations on the memory device 6230, for example, read, write, file system management and bad page management operations. The RAM 6222 may be operated according to control of the CPU 6221, and used as a work memory, buffer memory or cache memory. When the RAM 6222 is used as a work memory, data processed by the CPU 6221 may be temporarily stored in the RAM 6222. When the RAM 6222 is used as a buffer memory, the RAM 6222 may be used for buffering data transmitted to the memory device 6230 from the host 6210 or transmitted to the host 6210 from the memory device 6230. When the RAM 6222 is used as a cache memory, the RAM 6222 may assist the low-speed memory device 6230 to operate at high speed.

The ECC circuit 6223 may correspond to the ECC unit 138 of the controller 130 described in reference with FIG. 1. As described with reference to FIG. 1, the ECC circuit 6223 may generate an ECC (Error Correction Code) for correcting a fail bit or error bit of data provided from the memory device 6230. The ECC circuit 6223 may perform error correction encoding on data provided to the memory device 6230, thereby forming data with a parity bit. The parity bit may be stored in the memory device 6230. The ECC circuit 6223 may perform error correction decoding on data outputted from the memory device 6230. At: this time, the ECC circuit 6223 may correct an error using the parity bit. For example, as described with reference to FIG. 1, the ECC circuit 6223 may correct an error using the LDPC code, BCH code, turbo code, Reed-Solomon code, convolution code, RSC or coded modulation such as TCM or BCM.

The memory controller 6220 may transmit/receive data to/from the host 6210 through the host interface 6224, and transmit/receive data to/from the memory device 6230 through the NVM interface 6225. The host interface 6224 may be connected to the host 6210 through a PATA bus, SATA bus, SCSI, USB, PCIe or NAND interface. The memory controller 6220 may have a wireless communication function with a mobile communication protocol such as WiFi or Long-Term Evolution (LTE). The memory controller 6220 may be connected to an external device, for example, the host 6210 or another external device, and then transmit/receive data to/from the external device. In particular, as the memory controller 6220 is configured to communicate with the external device through one or more of various communication protocols, the memory system and the data processing system in accordance with an embodiment may be applied to wired/wireless electronic devices or particularly a mobile electronic device.

Figure 12:
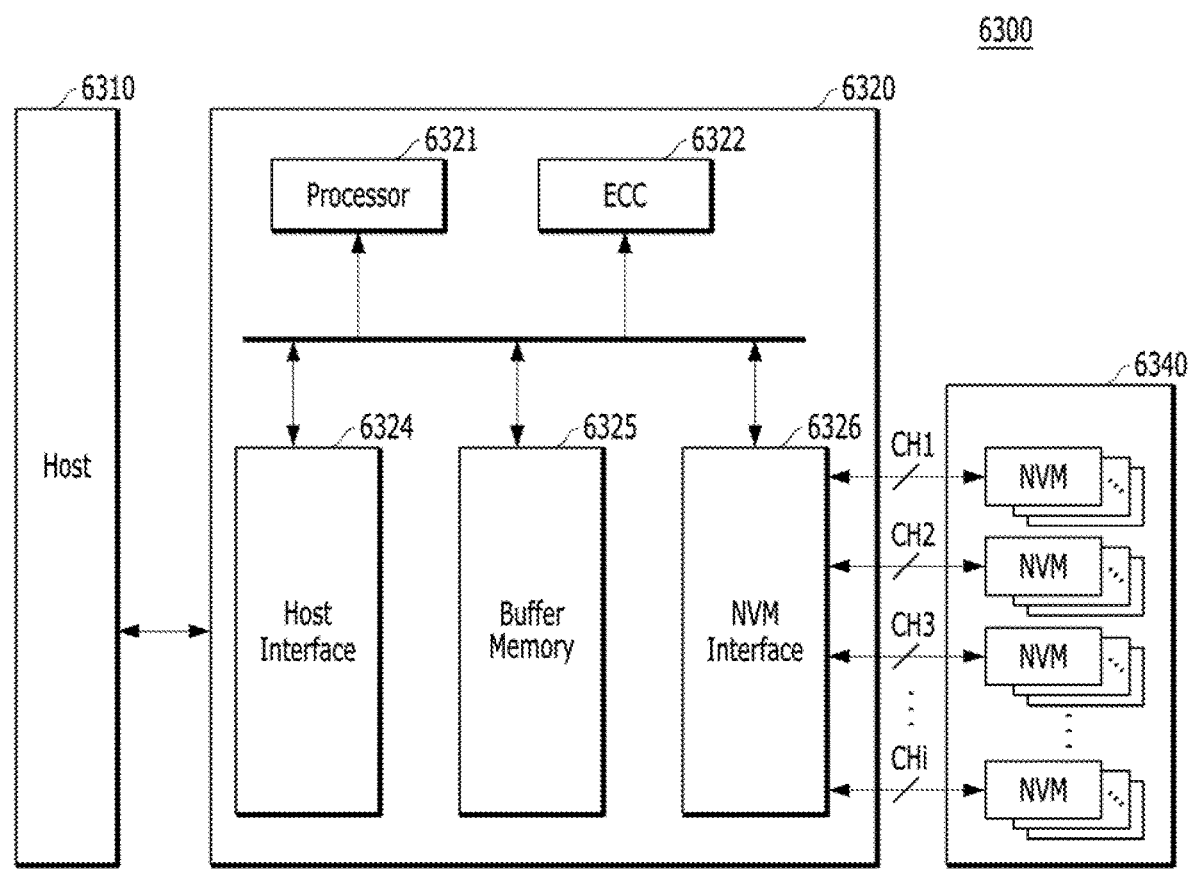

FIG. 12 is a diagram schematically illustrating another example of the data processing system including the memory system in accordance with an embodiment. FIG. 12 schematically illustrates an SSD to which the memory system in accordance with an embodiment is applied.

Referring to FIG. 12, the SSD 6300 may include a controller 6320 and a memory device 6340 including a plurality of nonvolatile memories. The controller 6320 may correspond to the controller 130 of FIGS. 1 to 9, and the memory device 6340 may correspond to the memory device 150 in the memory system of FIGS. 1 to 9.

More specifically, the controller 6320 may be connected to the memory device 6340 through a plurality of channels CH1 to CHi. The controller 6320 may include one or more processors 6321, a buffer memory 6325, an ECC circuit 6322, a host interface 6324 and a memory interface, for example, a nonvolatile memory interface 6326.

The buffer memory 6325 may temporarily store data provided from the host 6310 or data provided from a plurality of flash memories NVM included in the memory device 6340, or temporarily store meta data of the plurality of flash memories NVM, for example, map data including a mapping table. The buffer memory 6325 may be embodied by volatile memories such as DRAM, SDRAM, DDR SDRAM, LPDDR SDRAM and GRAM or nonvolatile memories such as FRAM, ReRAM, STT-MRAM and PRAM. For convenience of description, FIG. 11 illustrates that the buffer memory 6325 exists in the controller 6320. However, the buffer memory. 6325 may exist outside the controller 6320.

The ECC circuit 6322 may calculate an ECC value of data to be programmed to the memory device 6340 during a program operation, perform an error correction operation on data read from the memory device 6340 based on the ECC value during a read operation, and perform an error correction operation on data recovered from the memory device 6340 during a failed data recovery operation.

The host interface 6324 may provide an interface function with an external device, for example the host 6310 and the nonvolatile memory interface 6326 may provide an interface function with the memory device 6340 connected through the plurality of channels.

Furthermore, a plurality of SSDs 6300 to which the memory system 110 of FIGS. 1 to 9 is applied may be provided to embody a data processing system, for example, RAID (Redundant Array of Independent Disks) system. At this time, the RAID system may include the plurality of SSDs 6300 and a RAID controller for controlling the plurality of SSDs 6300. When the RAID controller performs a program operation in response to a rite command provided from the host 6310, the RAID controller may select one or more memory systems or SSDs 6300 according to a plurality of RAID levels, that is, RAID level information of the write command provided from the host 6310 in the SSDs 6300, and output data corresponding to the write command to the selected SSDs 6300. Furthermore, when the RAID controller performs a read command in response to a read command provided from the host 6310, the RAID controller may select one or more memory systems or SSDs 6300 according to a plurality of RAID levels, that is, RAID level information of the read command provided from the host 6310 in the SSDs 6300 and provide data read from the selected SSDs 6300 to the host 6310.

Figure 13:
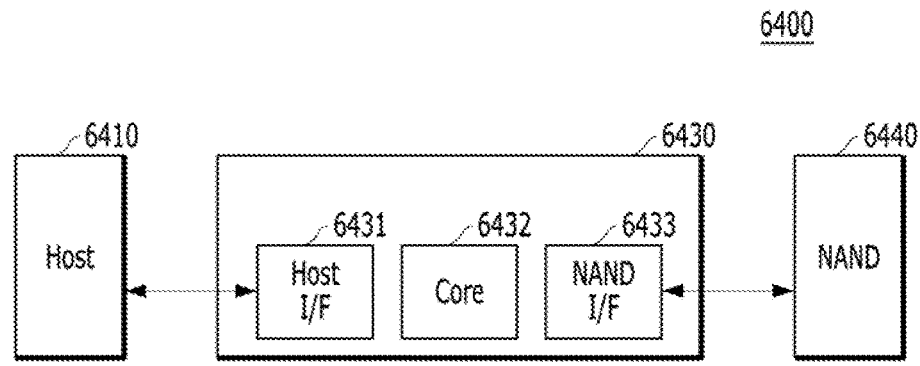

FIG. 13 is a diagram schematically illustrating another example of the data processing system including the memory system in accordance with an embodiment. FIG. 13 schematically illustrates an embedded Multi-Media Card (eMMC) to which the memory system in accordance with an embodiment is applied.

Referring to FIG. 13, the eMMC 6400 may include a controller 6430 and a memory device 6440 embodied by one or more NAND flash memories. The controller 6430 may correspond to the controller 130 of FIGS. 1 to 9, and the memory device 6440 may correspond to the memory device 150 of FIGS. 1 to 9.

More specifically, the controller 6430 may be connected to the memory device 6440 through a plurality of channels. The controller 6430 may include one or more cores 6432, a host interface 6431 and a memory interface, for example, a NAND interface 6433.

The core 6432 may control overall operations of the eMMC 6400, the host interface 6431 may provide an interface function between the controller 6430 and the host 6410, and the NAND interface 6433 may provide an interface function between the memory device 6440 and the controller 6430. For example, the host interface 6431 may serve as a parallel interface, for example, MMC interface as described with reference to FIG. 1. Furthermore, the host interface 6431 may serve as a serial interface, for example, UHS ((Ultra High Speed)-I/UHS-II) interface.

FIGS. 14 to 17 are diagrams schematically illustrating other examples of the data processing system including the memory system in accordance with an embodiment. FIGS. 14 to 17 schematically illustrate UFS (Universal Flash Storage) systems to which the memory system in accordance with an embodiment is applied.

Referring to FIGS. 14 to 17, the UFS systems 6500, 6600, 6700 and 6800 may include hosts 6510, 6610, 6710 and 6810, UFS devices 6520, 6620, 6720 and 6820 and UFS cards 6530, 6630, 6730 and 6830, respectively. The hosts 6510, 6610, 6710 and 6810 may serve as application processors of wired/wireless electronic devices or particularly mobile electronic devices, the UFS devices 6520, 6620, 6720 and 6820 may serve as embedded UFS devices, and the UFS cards 6530, 6630, 6730 and 6830 may serve as external embedded UFS devices or removable UFS cards.

The hosts 6510, 6610, 6710 and 6810, the UFS devices 6520, 6620, 6720 and 6820 and the UFS cards 6530, 6630, 6730 and 6830 in the respective UFS systems 6500, 6600, 6700 and 6800 may communicate with external devices, for example, wired/wireless electronic devices or particularly mobile electronic devices through UFS protocols, and the UFS devices 6520, 6620, 6720 and 6820 and the UFS cards 6530, 6630, 6730 and 6830 may be embodied by the memory system 110 described in reference with FIGS. 1 to 9. For example, in the UFS systems 6500, 6600, 6700 and 6800, the UFS devices 6520, 6620, 6720 and 6820 may be embodied in the form of the data processing system 6200, the SSD 6300 or the eMMC 6400 described with reference to FIGS. 11 to 13, and the UFS cards 6530, 6630, 6730 and 6830 may be embodied in the form of the memory card system 6100 described with reference to FIG. 10.

Furthermore, in the UFS systems 6500, 6600, 6700 and 6800, the hosts 6510, 6610, 6710 and 6810, the UFS devices 6520, 6620, 6720 and 6820 and the UFS cards 6530, 6630, 6730 and 6830 may communicate with each other through an UFS interface, for example, MIPI M-PHY and MIPI UniPro (Unified Protocol) in MIPI (Mobile Industry Processor Interface). Furthermore, the UFS devices 6520, 6620, 6720 and 6820 and the UFS cards 6530, 6630, 6730 and 6830 may communicate with each other through various protocols other than the UFS protocol, for example, UFDs, MMC, SD, mini-SD, and micro-SD.

Figure 14:
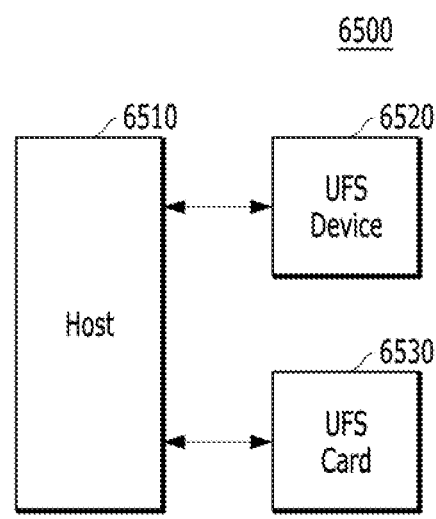

In the UFS system 6500 described in reference with FIG. 14, each of the host 6510, the UFS device 6520 and the UFS card 6530 may include UniPro. The host 6510 may perform a switching operation in order to communicate with the UFS device 6520 and the UFS card 6530. In particular, the host 6510 may communicate with the UFS device 6520 or the UFS card 6530 through link layer switching, for example, L3 switching at the UniPro. At this time, the UFS device 6520 and the UFS card 6530 may communicate with each other through link layer switching at the UniPro of the host 6510. In the present embodiment, the configuration in which one UFS device 6520 and one UFS card 6530 are connected to the host 6510 has been exemplified for convenience of description. However, a plurality of UFS devices and UFS cards may be connected in parallel or in the form of a star to the host 6410, and a plurality of UFS cards may be connected in parallel or in the form of a star to the UFS device 6520 or connected in series or in the form of a chain to the UFS device 6520.

Figure 15:
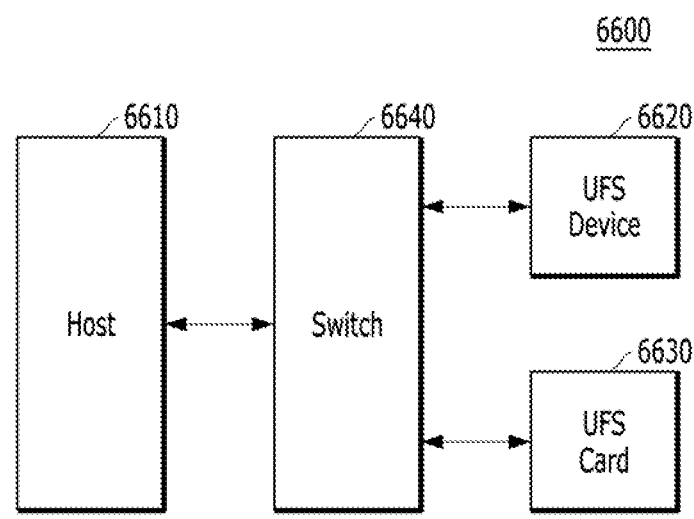

In the UFS system 6600 described in reference with FIG. 15, each of the host 6610, the UFS device 6620 and the UFS card 6630 may include UniPro, and the host 6610 may communicate with the UFS device 6620 or the UFS card 6630 through a switching its module 6640 performing a switching operation, for example, through the switching module 6640 which performs link layer switching at the UniPro, for example, L3 switching. The UFS device 6620 and the UFS card 6630 may communicate with each other through link layer switching of the switching module 6640 at UniPro. In the present embodiment, the configuration in which one UFS device 6620 and one UFS card 6630 are connected to the switching module 6640 has been exemplified for convenience of description. However, a plurality of UFS devices and UFS cards may be connected in parallel or in the form of a star to the switching module 6640, and a plurality of UFS cards may be connected in series or in the form of a chain to the UFS device 6620.

Figure 16:
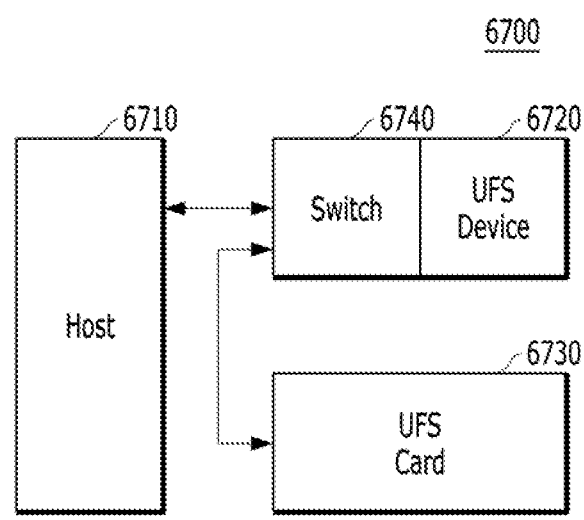

In the UFS system 6700 described in reference with FIG. 16, each of the host 6710, the UFS device 6720 and the UFS card 6730 may include UniPro, and the host 6710 may communicate with the UFS device 6720 or the UFS card 6730 through a switching module 6740 performing a switching operation, for example, through the switching module 6740 which performs link layer switching at the UniPro, for example, L3 switching. At this time, the UFS device 6720 and the UFS card 6730 may communicate with each other through link layer switching of the switching module 6740 at the UniPro, and the switching module 6740 may be integrated as one module with the UFS device 6720 inside or outside the UFS device 6720. In the present embodiment, the configuration in which one UFS device 6720 and one UFS card 6730 are connected to the switching module 6740 has been exemplified for convenience of description. However, a plurality of modules each including the switching module 6740 and the UFS device 6720 may be connected in parallel or in the form of a star to the host 6710 or connected in series or in the form of a chain to each other. Furthermore a plurality of UFS cards may be connected in parallel or in the form of a star to the UFS device 6720.

Figure 17:
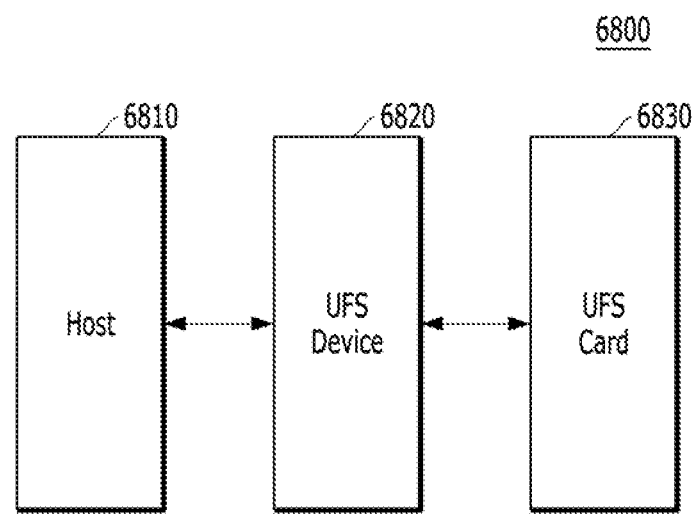

In the UFS system 6800 described in reference with FIG. 17, each of the host 6810, the UFS device 6820 and the UFS card 6830 may include M-PHY and UniPro. The UFS device 6820 may perform a switching operation in order to communicate with the host 6810 and the UFS card 6830. In particular, the UFS device 6820 may communicate with the host 6810 or the UFS card 6830 through a switching operation between the M-PHY and UniPro module for communication with the host 6810 and the M-PHY and UniPro module for communication with the UFS card 6830, for example, through a target ID (Identifier) switching operation. At this time, the host 6810 and the UFS card 6830 may communicate with each other through target ID switching between the M-PHY and UniPro modules of the UFS device 6820. In the present embodiment, the configuration in which one UFS device 6820 is connected to the host 6810 and one UFS card 6830 is connected to the UFS device 6820 has been exemplified for convenience of description. However, a plurality of UFS devices may be connected in parallel or in the form of a star to the host 6810, or connected in series or in the form of a chain to the host 6810, and a plurality of UFS cards may be connected in parallel or in the form of a star to the UFS device 6820, or connected in series or in the form of a chain to the UFS device 6820.

Figure 18:
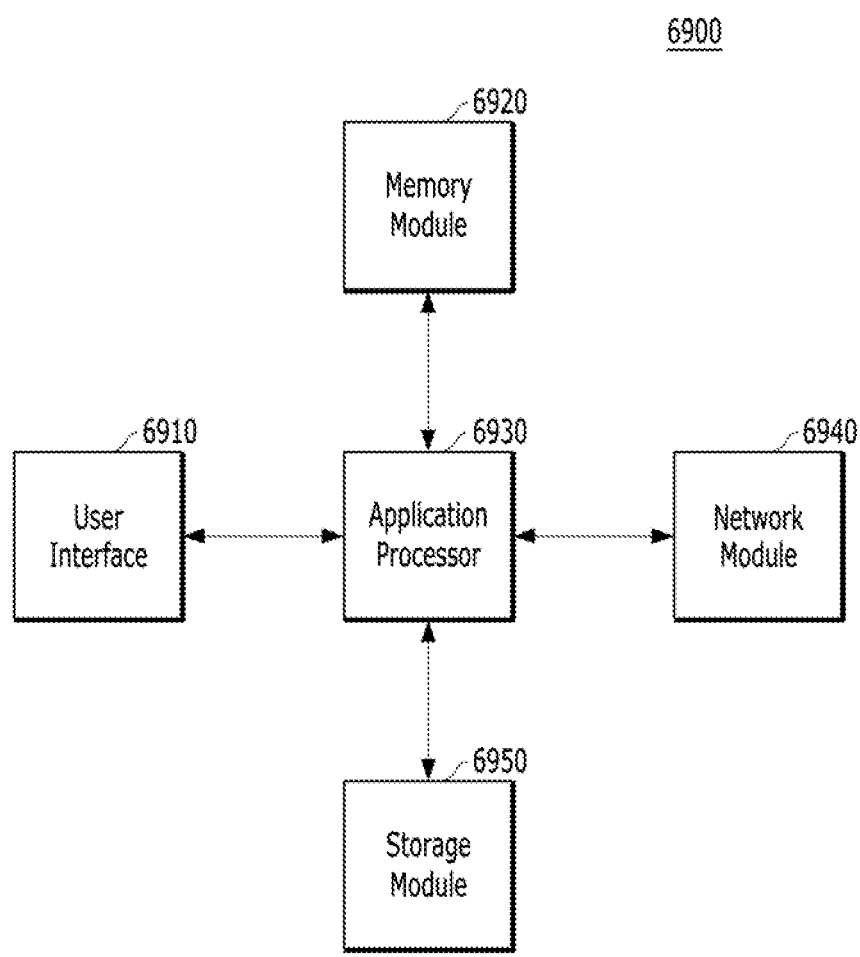

FIG. 18 is a diagram schematically illustrating another example of the data processing system including the memory system in accordance with an embodiment of the present invention, FIG. 18 is a diagram schematically illustrating a user system to which the memory system in accordance with an embodiment is applied.

Referring to FIG. 18, the user system 6900 may include an application processor 6930, a memory module 6920, a network module 6940, a storage module 6950 and a user interface 6910.

More specifically, the application processor 6930 may drive components included in the user system 6900, for example, an OS, and include controllers, interfaces and a graphic engine which control the components included in the user system 6900. The application processor 6930 may be provided as System-on-Chip (SoC).

The memory module 6920 may be used as a main memory, work memory, buffer memory or cache memory of the user system 6900. The memory module 6920 may include a volatile RAM such as DRAM, SDRAM, DDR SDRAM, DDR2 SDRAM, DDR3 SDRAM, LPDDR SDARM, LPDDR3 SDRAM or LPDDR3 SDRAM or a nonvolatile RAM such as PRAM, ReRAM, MRAM or FRAM. For example, the application processor 6930 and the memory module 6920 may be packaged and mounted, based on POP (Package on Package).

The network module 6940 may communicate with external devices. For example, the network module 6940 may not only support wired communication, but also support various wireless communication protocols such as code division multiple access (CDMA), global system for mobile communication (GSM), wideband CDMA (WCDMA), CDMA-2000, time division multiple access (TDMA), long term evolution (LTE), worldwide interoperability for microwave access (Wimax), wireless local area network (WLAN), ultra-wideband (UWB), Bluetooth, wireless display (WI-DI), thereby communicating with wired/wireless electronic devices or particularly mobile electronic devices. Therefore, the memory system and the data processing system, in accordance with an embodiment of the present invention, can be applied to wired/wireless electronic devices. The network module 6940 may be included in the application processor 6930.

The storage module 6950 may store data, for example, data received from the application processor 6930, and then may transmit the stored data to the application processor 6930. The storage module 6950 may be embodied by a nonvolatile semiconductor memory device such as a phase-change RAM (PRAM), a magnetic RAM (MRAM), a resistive RAM (ReRAM), a NAND flash, NOR flash and 3D NAND flash, and provided as a removable storage medium such as a memory card or external drive of the user system 6900. The storage module 6950 may correspond to the memory system 110 described with reference to FIGS. 1 to 9. Furthermore, the storage module 6950 may be embodied as an SSD, eMMC and UFS as described above with reference to FIGS. 12 to 17.

The user interface 6910 may include interfaces or inputting data or commands to the application processor 6930 or outputting data to an external device. For example, the user interface 6910 may include user input interfaces such a keyboard, a keypad, a button, a touch panel, a touch screen, a touch pad, a touch ball, a camera, a microphone, a gyroscope sensor, a vibration sensor and a piezoelectric element and user output interfaces such as a liquid crystal display (LCD), an organic light emitting diode (OLED)

display device, an active matrix OLED (AMOLED) display device, an LED, a speaker and a motor.

Furthermore, when the memory system 110 of FIGS. 1 to 9 is applied to a mobile electronic device of the user system 6900, the application processor 6930 may control overall operations of the mobile electronic device, and the network module 6940 may serve as a communication module for controlling wired/wireless communication with an external device. The user interface 6910 may display data processed by the processor 6930 on a display/touch module of the mobile electronic device, or support a function of receiving data from the touch panel.

The memory system and the operating method thereof according to the embodiments may minimize complexity and performance deterioration of the memory system and maximize use efficiency of a memory device, thereby quickly and stably process data with respect to the memory device.

Although various embodiments have been described for illustrative purposes, it will be apparent to those skilled in the art that various changes and modifications may be made without departing from the spirit and scope of the invention as defined in the following claims.

What is claimed is:

1. A memory system comprising:
a memory device; and
a controller suitable for:
receiving a plurality of commands from a host;
performing command operations corresponding to the commands to the memory device;
providing operation results of the command operations to the host; and
individually processing the performing of the command operations and the providing of the operation results for the command operations at a regular time duration interval,
wherein the controller includes a first command queue for storing the commands transferred from the host and a second command queue for storing the operation results transferred from the memory device, and
wherein the controller transfers the commands from the first command queue to the second command queue and the operation results from the second command queue to the first command queue at a regular time duration interval.

2. The memory system according to claim 1, wherein the controller is suitable for setting the regular time duration interval in correspondence to capabilities for the commands in the memory system and queue capacities of command queues in the controller.

3. The memory system according to claim 2, wherein the regular time duration interval is defined as processing time durations and idle time durations for the commands and the command operations.

4. The memory system according to claim 2, wherein the controller is suitable for receiving the commands from the host at the regular time duration interval, and transferring the commands between the command queues at the regular time duration interval.

5. The memory system according to claim 2, wherein the controller is suitable for requesting performing of the command operations to the memory device through the command queues at the regular time duration interval, and providing the operation results to the host through the command queues at the regular time duration interval.

6. The memory system according to claim 5, wherein the controller is suitable for receiving the commands from the host at the regular time duration interval based on the first command queue at an interface for the host, and transferring requests for performing of the command operations to the memory device at the regular time duration interval based on the second command queue at an interface for the memory device.

7. The memory system according to claim 6, wherein the controller is suitable for transferring the commands from the first command queue to the second command queue at the regular time duration interval.

8. The memory system according to claim 5, wherein the controller is suitable for receiving the operation results from the memory device at the regular time duration interval based on the second command queue at the interface for the memory device, and transferring the operation results to the host at the regular time duration interval through the first command queue at the interface for the host.

9. The memory system according to claim 8, wherein the controller is suitable for transferring the operation results from the second command queue to the first command queue at the regular time duration interval.

10. The memory system according to claim 1, wherein the controller is suitable for receiving the commands from the host initially in correspondence to a maximum queue capacity of the command queues.

11. A method for operating a memory system, the method comprising:
receiving a plurality of commands from a host;
performing command operations corresponding to the commands, in the memory device;
and
providing operation results of the command operations to the host,
wherein the performing of the command operations and the providing of the performance results are individually processed at a regular time duration interval,
wherein storing the commands transferred from the host in a first command queue and the operation results transferred from the memory device in a second command queue, and
wherein the commands are transferred from the first command queue to the second command queue at a regular time duration interval and the operation results are transferred from the second command queue to the first command queue at a regular time duration interval.

12. The method according to claim 11, further comprising:
setting the regular time duration interval in correspondence to capabilities for the commands in the memory system and queue capacities of command queues in the controller.

13. The method according to claim 12, wherein the regular time duration interval is defined as processing time durations and idle time durations for the commands and the command operations.

14. The method according to claim 12, further comprising transferring the commands between the command queues at the regular time duration interval; and
requesting performing of the command operations to the memory device through the command queues at the regular time duration interval.

15. The method according to claim 14,
wherein the receiving of the commands comprises receiving the commands from the host at the regular time duration interval through the first command queue at an interface for the host, and wherein the requesting of the performing of the command operation comprises transferring requests for performing of the command operations, to the memory device at the regular time duration interval through the second command queue at an interface for the memory device.

16. The method according to claim 15, wherein the transferring of the commands between the command queues comprises transferring the commands from the first command queue to the second command queue at the regular time duration interval.

17. The method according to claim 12, further comprising:
transferring the performance results between the command queues at the regular time duration interval.

18. The method according to claim 17, wherein the providing comprises:
receiving the performance results from the memory device at the regular time duration interval based on the second command queue at the interface for the memory device; and
transferring the performance results to the host at the regular time duration interval based on the first command queue at the interface for the host.

19. The method according to claim 18, wherein the transferring of the performance results between the command queues comprises transferring the performance results from the second command queue to the first command queue at the regular time duration interval.

20. The method according to claim 11, wherein the receiving further comprises receiving the commands from the host initially in correspondence to a maximum queue capacity of the command queues.

* * * * *